United States Patent
Lord et al.

(10) Patent No.: US 9,008,315 B2
(45) Date of Patent: Apr. 14, 2015

(54) SHARED SECRET ARRANGEMENTS AND OPTICAL DATA TRANSFER

(71) Applicant: Digimarc Corporation, Beaverton, OR (US)

(72) Inventors: John D. Lord, West Linn, OR (US); John Stach, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 59 days.

(21) Appl. No.: 13/888,939

(22) Filed: May 7, 2013

(65) Prior Publication Data

US 2014/0057676 A1    Feb. 27, 2014

Related U.S. Application Data

(63) Continuation-in-part of application No. 13/745,270, filed on Jan. 18, 2013, now Pat. No. 8,879,735.

(60) Provisional application No. 61/589,241, filed on Jan. 20, 2012.

(51) Int. Cl.
*H04M 1/02* (2006.01)
*H04B 10/114* (2013.01)
(Continued)

(52) U.S. Cl.
CPC ......... *H04M 1/0264* (2013.01); *H04B 10/1141* (2013.01); *H04B 10/116* (2013.01); *H04L 63/0428* (2013.01); *H04L 63/18* (2013.01); *H04W 12/06* (2013.01); *H04L 63/083* (2013.01)

(58) Field of Classification Search
CPC combination set(s) only.
See application file for complete search history.

(56) References Cited

U.S. PATENT DOCUMENTS 4,807,031 A    2/1989    Broughton et al.
6,590,996 B1    7/2003    Reed et al.
(Continued)

FOREIGN PATENT DOCUMENTS

WO    WO2007045937    4/2007
WO    WO2009032522    3/2009
(Continued)

OTHER PUBLICATIONS

PCT International Preliminary Report on Patentability, PCT/US2013/022209 (published as WO2013109934), mailed Jul. 31, 2014.

(Continued)

*Primary Examiner* — Beemnet Dada
(74) *Attorney, Agent, or Firm* — Digimarc Corporation

(57) ABSTRACT

Digital data is optically broadcast through an environment by controllably switching the brightness or chrominance of LED solid state lamps, or of other illumination sources (e.g., television screens and backlit computer displays). This optical data channel is useful to convey cryptographic key data by which devices within the environment can authenticate themselves to a secure network. In some embodiments, the optical modulation is sensed by the camera of a smartphone. The row data output by the smartphone's camera sensor is processed to extract the modulated data signal. In some monochrome embodiments, data communication speeds far in excess of the camera's frame rate (e.g., 30/second), or even the camera's row rate (e.g., 14,400/second) are achieved. Still greater rates can be achieved by conveying different data in different chrominance channels. A great number of other features and arrangements are also detailed.

10 Claims, 14 Drawing Sheets

(51) Int. Cl.
*H04B 10/116* (2013.01)
*H04W 12/06* (2009.01)
*H04L 29/06* (2006.01)

(56) References Cited

U.S. PATENT DOCUMENTS

| | | | |
|---|---|---|---|
| 6,865,589 | B2 | 3/2005 | Haitsma et al. |
| 7,223,956 | B2 | 5/2007 | Yoshida |
| 7,996,678 | B2 | 8/2011 | Kalker et al. |
| 8,150,255 | B2 | 4/2012 | Tsai |
| 8,279,138 | B1 | 10/2012 | Margulis |
| 8,334,898 | B1 | 12/2012 | Ryan et al. |
| 8,798,266 | B2 * | 8/2014 | Drader et al. .................. 380/44 |
| 2004/0091111 | A1 | 5/2004 | Levy et al. |
| 2004/0111601 | A1 | 6/2004 | Racz |
| 2004/0250079 | A1 | 12/2004 | Kalker |
| 2005/0132194 | A1 | 6/2005 | Ward |
| 2006/0133647 | A1 | 6/2006 | Werner et al. |
| 2006/0256070 | A1 | 11/2006 | Moosavi et al. |
| 2007/0187505 | A1 | 8/2007 | Rhoads et al. |
| 2009/0129782 | A1 | 5/2009 | Pederson |
| 2009/0220070 | A1 | 9/2009 | Picard et al. |
| 2010/0005294 | A1 * | 1/2010 | Kostiainen et al. ........... 713/168 |
| 2010/0046639 | A1 * | 2/2010 | Bennett .................... 375/240.28 |
| 2010/0150434 | A1 | 6/2010 | Reed |
| 2010/0171875 | A1 | 7/2010 | Yamamoto |
| 2010/0223461 | A1 | 9/2010 | Drader et al. |
| 2011/0058707 | A1 | 3/2011 | Rhoads et al. |
| 2011/0069958 | A1 | 3/2011 | Haas |
| 2011/0121950 | A1 | 5/2011 | Izadi et al. |
| 2011/0153201 | A1 | 6/2011 | Park et al. |
| 2011/0161076 | A1 | 6/2011 | Davis et al. |
| 2011/0212717 | A1 | 9/2011 | Rhoads et al. |
| 2011/0277023 | A1 | 11/2011 | Meylemans et al. |
| 2012/0208592 | A1 | 8/2012 | Davis et al. |
| 2012/0281987 | A1 | 11/2012 | Schenk |
| 2013/0016978 | A1 | 1/2013 | Son et al. |
| 2013/0027576 | A1 | 1/2013 | Ryan et al. |
| 2013/0028612 | A1 | 1/2013 | Ryan et al. |
| 2013/0058390 | A1 | 3/2013 | Haas |
| 2013/0089133 | A1 | 4/2013 | Woo et al. |
| 2013/0126713 | A1 | 5/2013 | Haas et al. |
| 2013/0141555 | A1 | 6/2013 | Ganick et al. |

FOREIGN PATENT DOCUMENTS

| | | |
|---|---|---|
| WO | WO2012127439 | 9/2012 |
| WO | WO2014063150 | 4/2014 |
| WO | WO2014083363 | 6/2014 |

OTHER PUBLICATIONS

International Search Report and Written Opinion from PCT/US2013/022209, mailed Apr. 17, 2013.

Machine translation of JP2007295490 (JP2007295490 was published Nov. 8, 2007).

Liu, Positioning Beacon System Using Digital Camera and LEDs, IEEE Trans. on Vehicular Technology, Vo. 52, No. 2, 2003.

Pang et al, LED Location Beacon System Based on Processing of Digital Images, IEEE Trans. on Intelligent Transportation Systems, vol. 2, No. 3, 2001.

Woo et al, VRCodes—Unobtrusive and Active Visual Codes for Interaction by Exploiting Rolling Shutter, IEEE Int'l Symp. on Mixed and Augmented Reality, Nov. 2012.

Woo, VRCodes: Embedding Unobtrusive Data for New Devices in Visible Light, MIT PhD Thesis, Sep. 2012.

Ganick, U.S. Appl. No. 61/567,484, filed Dec. 6, 2011 (priority application for patent 8,334,898).

Ryan et al, U.S. Appl. No. 61/511,589, filed Jul. 26, 2011 (priority application for patent publication 20130027576).

\* cited by examiner

SHARED SECRET ARRANGEMENTS AND OPTICAL DATA TRANSFER

RELATED APPLICATION DATA

This application is a continuation-in-part of copending application Ser. No. 13/745,270, filed Jan. 18, 2013, which claims priority to provisional application 61/589,241, filed Jan. 20, 2012.

TECHNICAL FIELD

The present technology concerns optical data communication and applications thereof, e.g., involving sharing secrets, and detection of serial optical data by cameras of mobile phones.

INTRODUCTION

Wireless network security is commonly effected through use of shared secrets. For example, when a visitor to a company seeks to connect a laptop computer to the company's wireless network, the visitor must typically first enter a secret network password in a UI presented on the laptop screen. If the visitor enters the correct password, the device and the network can establish a secure (encrypted) communication channel, and the network enrolls the laptop as an authorized device on the network.

Sometimes a network-associated password cannot be entered into an enrolling device to effect authentication. For example, the enrolling device may be a set of wireless loudspeakers, or other hardware that does not have a display on which a UI can be presented. In such circumstances, authentication to the network can be effected by providing a device-associated password to the network (instead of a network-associated password to the device). An industry standard for this arrangement, known as Wi-Fi Protected Setup, assigns a 4- or 8-digit PIN code to a device (e.g., printed on a tag affixed to the device). To connect the device to the network, the user enters the device PIN code in a UI presented on an already-connected network device (e.g., a PC that is connected to a network router). The sharing of this device-associated secret between the new device and the network again allows the components to establish a secure (encrypted) communication channel, and enrolls the device as a network-authorized device.

Patent publication 20110277023 details that a device's PIN can be provided audibly from the device to the network, rather than by entry of text characters in a UI. In one embodiment, this is done by providing a loudspeaker in the enrolling device, and a microphone in a network router. The device secret may be conveyed by a series of audible tones.

Audible conveyance of a shared secret is attractive in theory but difficult in practice. Indoor environments commonly have a variety of different noise sources. These noise sources cannot be well-characterized in advance. Neither their spectral content, nor their amplitude, nor their temporal characteristics can be predicted. As such, devices that share a secret in audible fashion must be placed in close proximity to each other, and the conveyed audio signal must be of a significant amplitude, if interference from possible noise sources is to be reliably overcome.

In accordance with one aspect of the present technology, a secret is shared optically between two devices. In some implementations, light emitting diodes—such as are increasingly used for office illumination and display backlighting (e.g., in smartphone screens and larger informational displays)—are modulated to convey the secret data. In some implementations, the cameras of network-connected smartphones are used to sense the optical modulation. Because indoor environments are much quieter optically than acoustically, such approaches do not suffer the noise-related drawbacks of audio-based arrangements.

In one particular embodiment, LED lighting in a home is modulated to broadcast a network-associated secret needed by other devices to wirelessly connect to a home network.

In accordance with another aspect of the technology, LED lighting is used to optically convey data to camera-equipped portable devices, such as smartphones. While such cameras may captures only 30 frames of imagery per second (or only 14,400 lines of imagery per second), optical communication at bit data rates far in excess of these numbers can be achieved.

The foregoing and additional features and advantages of the present technology will be more readily apparent from the following description, which proceeds with reference to the accompanying drawings.

BRIEF DESCRIPTION OF THE DRAWINGS

FIG. 11 illustrates how a coded aperture can be effected by reading pixel data multiple times without resetting in-between.

DETAILED DESCRIPTION

Figure 1:
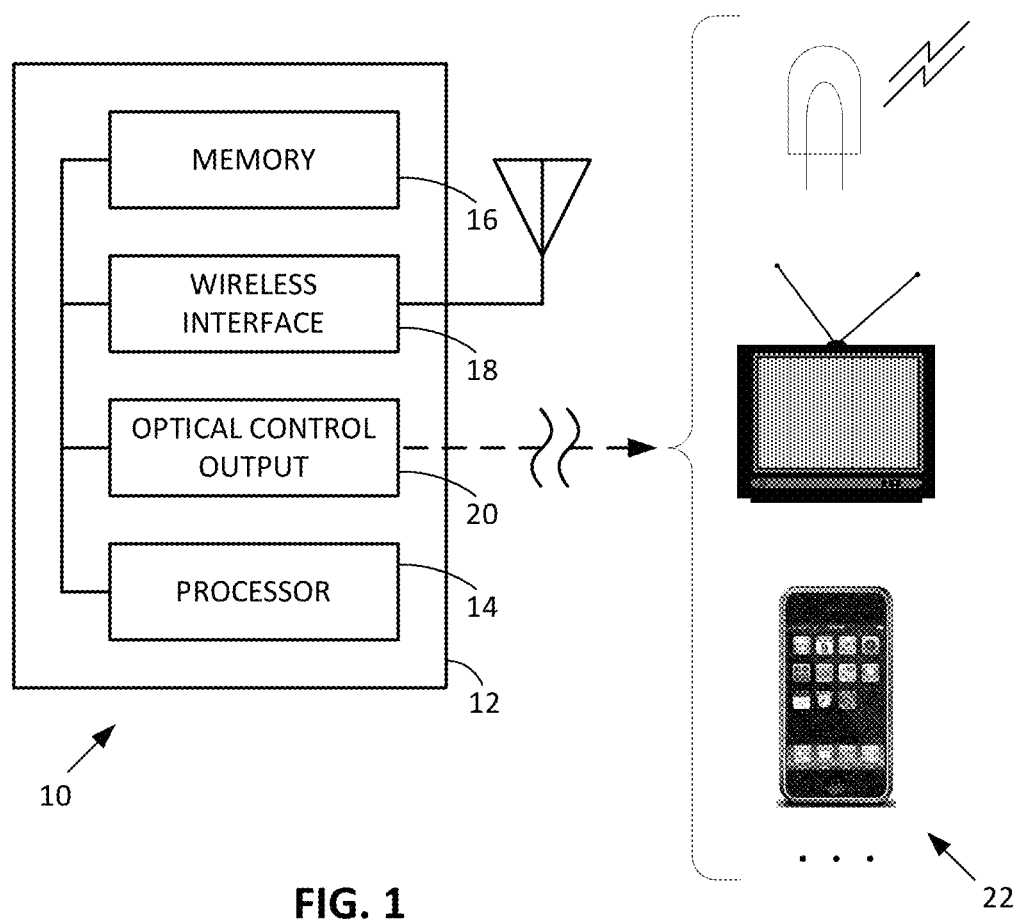
FIG. 1 is a diagram of a device in accordance with one embodiment of the present technology.

Referring to FIG. 1, an embodiment 10 incorporating certain aspects of the present technology employs a router or other device 12 that includes a processor 14, a memory 16, a wireless interface 18, and an optical control output 20.

The memory includes program instructions that configure and control the device hardware—including processor—for operation. The memory also includes a password used for network security. Illustrative network security arrangements that employ passwords include WEP, WPA and WPA2.

Router 12 is conventional, with the exception of the optical control output 20. This output provides a signal used in optically conveying the router password to other devices.

The right side of FIG. 1 shows some of the many different devices 22 that can receive the signal from the optical control output, and emit corresponding optical signals into a user's environment. Such devices commonly include one or more light emitting diodes.

One particular type of optical emitter 22 is LED-based home/office lighting. The Greenchip line of lighting by NXP Semiconductor is illustrative, and includes LED lights (sometimes termed "SSLs"—solid state lights) with integrated IP6 connectivity. That is, every light has its own internet address.

"JenNet"-IP network software provides wireless connectivity for the LED devices. JenNet is a 6LoWPAN mesh-under-tree network employing IEEE 802.15.4-based networking. Through this arrangement, a light's operating parameters can be changed based on IP6 data transmitted across the wiring network. These parameters include not just amplitude but also chrominance, since the SSLs typically comprise three or more colors of LEDs, which can be controlled separately.

In such an implementation, the signal provided from the optical control output 20 of device 12 is an IP6 data stream that is conveyed across the power network and serves to control the luminance and/or chrominance of light emitted by the light 22 to convey the device password.

In other embodiments, the control signal provided by router output 20 can control the LED backlight of a flat panel television or smartphone. Depending on the implementation, the control signal may be analog.

In still other embodiments, the device 12 can itself be equipped with an LED whose operation is controlled in accordance with the signal from the optical control output. For example a printer may include a backlit display panel in which the LED backlight is controlled to emit the printer's password data.

Figure 2:
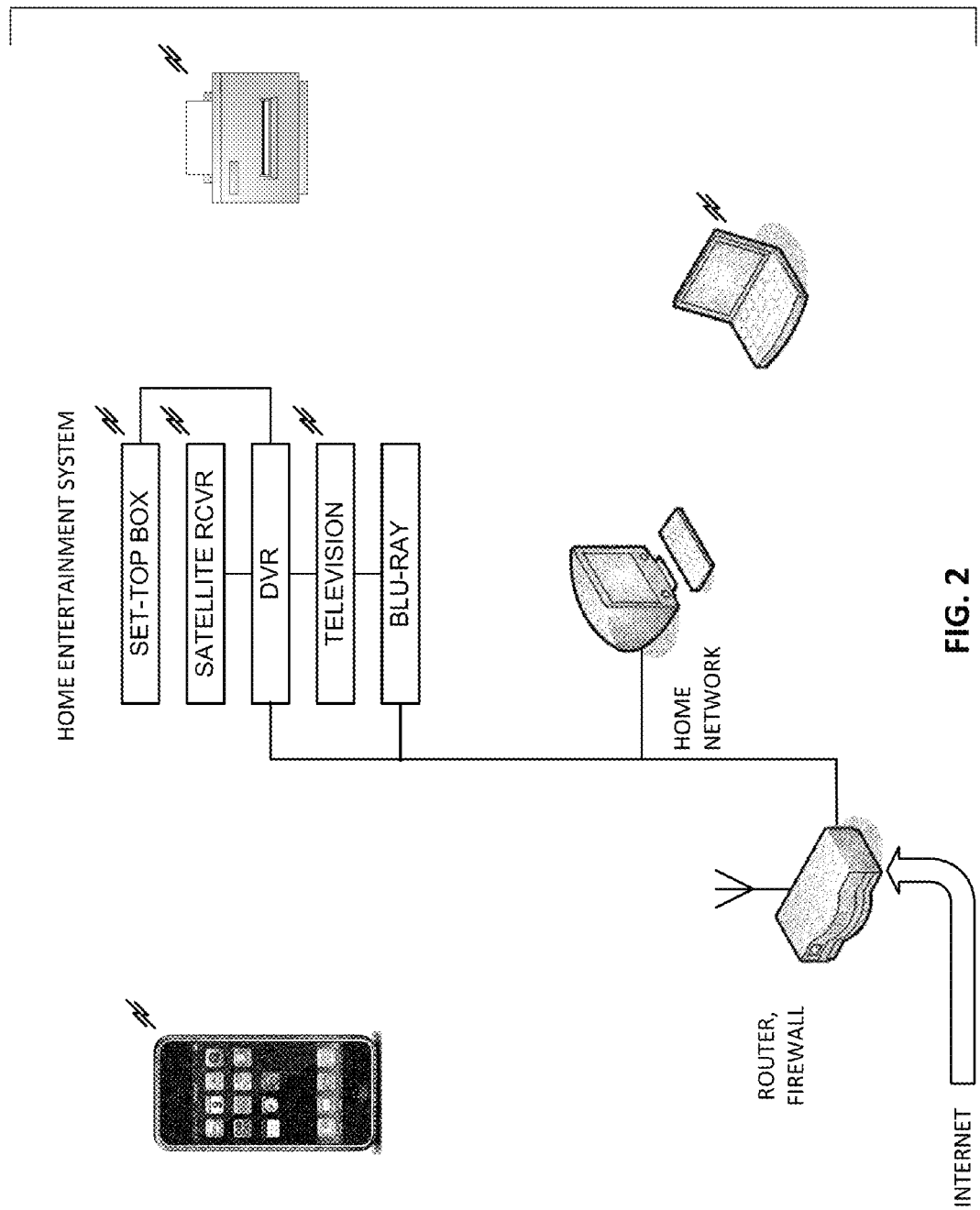
FIG. 2 is a diagram showing devices in a home network.

FIG. 2 shows an illustrative implementation including the router earlier discussed, and various other devices that are linked—by wire or wirelessly—to a home network. The detailed devices can each include an optical emitter and/or an optical sensor.

The modulation of light to convey signal data can be by any known means. For example, ASCII symbols representing the characters of the password can be pulse width modulation-encoded by varying the luminance output 10% (or 5% or 2%, etc.). The data can be endlessly repeated, with a synchronizing symbol indicating the start of the series. Error correcting coding techniques can be employed. The data rate can be as fast or slow as the application dictates. (In some embodiments it may be acceptable to sample the ambient light field for 30 seconds or more in order to discern the secret; in others embodiments a time less than 3 seconds may be desired.)

In another arrangement the optical data is conveyed along with image information presented by a display device. That is, imagery presented by the display is varied in human-imperceptible fashion to also encode the password data. Many different such technologies are known, dating back at least to U.S. Pat. No. 4,807,031, and including patent document 20040250079. (Others are detailed below.)

A variety of different arrangements can be used to sense such light signals. Perhaps the most common is the camera that is now included in nearly every cell phone. Laptops and tablets, too, often have cameras. (As is familiar, such cameras typically include a planar sensor comprising a grid-like array of photodetectors implemented with CMOS or CCD technology, onto which a lens projects an image of a subject.)

In camera-based receivers, recovery of a focused image is not necessary. Instead, one or more of the camera focus controls (e.g., a range sensing module, a local contrast determination module, a mechanical focus system, etc.) can be disabled, so that unfocused illumination strikes the sensor. By such arrangement, the camera's focus may be at a value that is independent of a distance between the camera and a subject to which it is pointing.

Instead of disabling a signal or mechanism used in focusing the camera, the camera's focus control arrangements can be utilized to intentionally focus the camera at a focal plane that results in maximal blurriness of the captured image data. For example, if the camera is pointed at a ceiling 5 feet away, and the camera has the ability to focus at subjects between 3.5 feet and infinity, the camera focus may be set to infinity. Similarly, if the camera is pointed at a far distant subject, the camera focus may be set to 3.5 feet to maximize blurriness of the captured imagery.

The outputs of some or all of the camera photodetectors can be averaged to yield a single output signal. For example, all of the photodetectors of one or more selected rows can be used, or a regular or random or foveal sampling of photodetectors across the frame can be used. In chrominance-based arrangements, only pixels of certain colors may be used in averaging. (In some arrangements, all the cells/rows can be used for the average.)

Each time the camera captures a new frame, a new value of output signal is provided. If the camera outputs 30 frames per second, the output signal can change every 33.3 milliseconds.

The value of this output signal will depend, in part, on the subject towards which the camera is pointed. If the camera is pointed towards a dark wall, the signal will tend to have a lower value than if the camera is pointed towards a white wall. However, if the camera is held relatively stationary, then the subject-dependency of the output signal will be relatively constant. Changes in the output signal will then be due primarily to changes in the ambient light illuminating the wall, e.g., from modulated overhead lighting fixtures.

If the modulated light source is the backlight of a television screen or other display, the same effect is present. While the average luminance of the image presented on the screen display will change with time, it changes at a rate much slower than 30 frames/second. (On average, each frame of television or signage imagery is highly correlated—in terms of brightness and chrominance—to the next.) Thus, a high-pass filter can be applied to the averaged output signal to attenuate the effect of the slow-changing image presentation, and pass the more rapidly changing signal caused by the present technology's modulation of a light emitter.

Instead of using an image sensor, other receiving devices according to the present technology can use a single photocell, such as the type employed by televisions and other home entertainment components to receive infrared control signals from remote control units.

In one particular implementation, device 12 is a wireless router, and the WPA password used by the router is pulse-width-modulated onto illumination emitted by solid state lights throughout a home or office. A visitor wanting access to the wireless network launches an app on an iPhone that senses the ambient light with the phone camera (e.g., pointing the camera at a blank space on the wall, or towards the light), and discerns/decodes the modulation signal to recover the WPA password. The app then uses this password in known fashion to log into the wireless network.

In another particular implementation, device 12 is a printer. Its device password is modulated onto illumination emitted by a backlight behind the printer's control panel. To connect the printer to the network, a user samples the modulated backlight using a smartphone that is already authorized on the network. The smartphone app decodes the device password and passes it across the network to a wireless router, which then establishes a secure connection with the printer using known arrangements (e.g., Wi-Fi Protected Setup).

Home entertainment components, such as DVD players, streaming (internet) video devices (Boxee, AppleTV, and the like), satellite receivers, televisions, set-top boxes, etc., can modulate presented video imagery to subliminally convey a PIN or other secret associated with the component. A smartphone can decode this PIN data from the imagery, and use this shared secret to establish a secure, authenticated session with the component. For example, with the secret, the phone can communicate directly with the home entertainment component—across a wireless network. Or the phone can access a secure web page that serves as a UI through which the component can be controlled. Once authorized by the shared secret, the smartphone can be used to control any aspect of component operation, such as changing the channel, ordering videos on demand, engaging with interactive television features including voting and quizzes, etc. Different UIs can be presented on the screen of the smartphone for these purposes, either by one or more smartphone apps, or by web interfaces accessed from a remote server.

Alternatively, the home entertainment component may have a visible or IR LED on the front panel that sends out an optical beacon to convey its secret data to nearby optical sensors.

One of the advantages of optical conveyance of authentication data is that it typically cannot be used from outside a building (unlike a hacker sitting in a company's parking lot—connecting to a company's network by WiFi). Instead, line of sight is commonly required. However, sometimes the line of sight requirement is a hindrance.

In such instances, a smartphone can serve as a relay. For example, in a home, a homeowner may use a smartphone camera to receive optically-transmitted authentication data from a modulated light source on the first floor (e.g., based on authentication data from a router). The homeowner can then take the phone upstairs, and re-broadcast the authentication data to another device (e.g., a home entertainment system component), which needs the authentication data to log onto the home network. (E.g., the phone can take the authentication data it decoded downstairs, re-encode it for optical transmission, and then control the LED torch on the phone in accordance with the encoded signal—thereby re-broadcasting the signal from a new location in the home).

If the security protocol is two-way, requiring the home entertainment system to send information back to the originating device (e.g., router), same can be done over the home network. Alternatively, the process can be repeated. The home entertainment system component can transmit information to the phone (e.g., by Bluetooth or optical signaling). This information can be decoded by the phone, which the homeowner can take downstairs. The phone can then be operated to play-back (e.g., optically) the just-decoded data for reception by the router.

It will be understood that certain implementations of the technology enable multiple viewers in a room to exercise control over home electronic components or other devices. No longer is there a single remote control that is entrusted to a single viewer.

An optical sensor may be pointed to the source of an optical signal, and may respond only to that signal. However, just as a wireless router can communicate with multiple different devices, so too can an optical receiver monitor several different optical data streams. For example, a smartphone app can implement several different detectors to which the optical information collected by the phone camera is applied—each applying a different detection strategy, or looking for a different signaling protocol. For example, some may be looking for luminance-based signaling, while others may be looking for chrominance-based signaling. Some may look for amplitude modulation; others for phase modulation. Some may look for signals with data rates of 30 bits per second; others may look for signals with data rates of 300 bits per second. Some may look for pulse width modulation; others for pulse position modulation. Even within the same transport protocol, a Sony app may be looking for signals whose payloads identify a Sony device, while a Samsung app may ignore those and instead respond to signals whose payloads correspond to Samsung devices.

Likewise, information sensed from several different emitters can be used to establish authenticated sessions with several different devices. For example, once an optical signal has been received, and several transport streams have been decoded and identified, a single app or different apps on a smartphone can establish encrypted communications with different remote devices, and these links can be maintained simultaneously—including when the user has left the environment in which the optical illumination was originally sensed. That is, some implementations set up a persistent authenticated session that can be utilized after the user leaves the home (or office) in which it was established.

Thus, a single smartphone app (or multiple apps) can receive signals from overhead lighting, an IR emitter on a home stereo system, the screen of a television, etc. Based on information received from these sources, the smartphone may establish or utilize WiFi, Bluetooth and Zigbee wireless links, and use these links to establish authenticated sessions with a home HVAC system, a home security system, appliances, printers, etc.

The present technology can also be used in exchanging entertainment content (songs, videos, etc.) between devices. For example, a user's smartphone may log into a home WiFi network using password data broadcast by the home's lighting system. A DVD player in the home may be playing a movie, and the user may wish to store a copy on the smartphone.

More on Phone Cameras as Optical Data Receivers

While smartphone cameras and most other image sensors are regarded as capturing a frame of imagery at a time, many actually sample photodetector data on a successive row-by-row basis (or, less commonly, on a successive pixel-by-pixel basis). For example, a smartphone camera that captures 30 frames per second (where each frame is 480 rows by 640 columns), may more accurately be regarded as sampling photodetector data from 14,400 rows per second—each row gathering light over a different interval of time. Thus, not all parts of the image are recorded at the same time.

Still further, there may be a brief interval at the end of each frame read-out in which certain logic is reset to prepare for the next frame. So the reading period for each individual row may not be 1/14,400 of a second, but more like 1/15,000 of a second (i.e., 66.7 microseconds). Reading 480 successive rows then takes a total of 32 milliseconds, followed by a 1.33 millisecond logic-reset interval before the next sequence of 480 rows is read.

In a particular implementation, the present technology averages the values of the 640 pixels in a row, to produce an output value for that row. Likewise with each succeeding row. If the camera is unfocused, these output values will less strongly correlate with information about a subject towards which the camera is pointing, and will more strongly correlate with the ambient illumination during that row's respective sampling interval.

If the camera is capturing 30 frames per second in low light conditions, then each row may be exposed for the maximum possible interval of 33.3 milliseconds (since 30 such frames are captured in a second, and serial processing is assumed). However, the exposure intervals for successive rows are successively staggered by 66.7 microseconds (i.e., 0.0667 milliseconds). For example, the signal read from Row2 arises from an exposure interval that begins 66.7 microseconds later than the exposure interval for Row1. The exposure interval for Row2 similarly ends 66.7 microseconds later than the exposure interval for Row1. While much of the Row2 exposure interval overlaps that of Row1, there is a difference. This difference grows greater with distance between the rows until, at some distance, two rows' exposure intervals don't overlap at all. This allows sampling of the ambient light field at greater than the 30 frames per second.

Figure 3A:
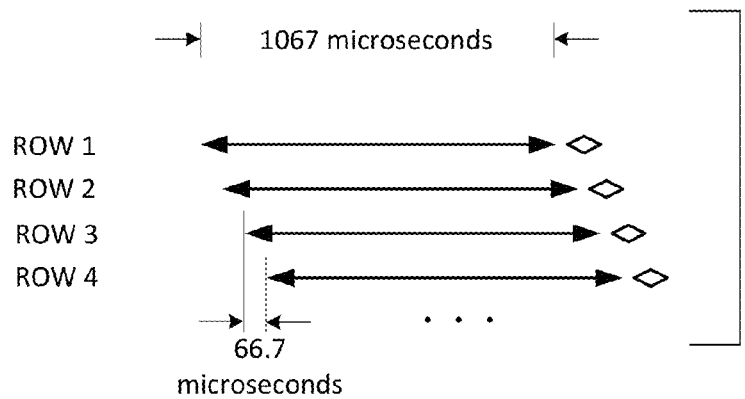
FIGS. 3A and 3B detail the time-shifted sampling intervals of rows of a smartphone camera.
Figure 3B:
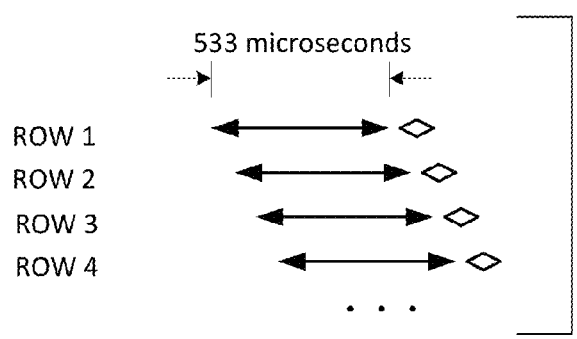

Sample timing is illustrated in FIGS. 3A and 3B. FIG. 3A shows how the start (and end) of each row's sampling interval is delayed by 66.7 microseconds, relative to the previous row. Each of the depicted row sampling intervals in FIG. 3A is 1067 microseconds. (The diamond feature illustrates the reading phase of sensor operation, as opposed to the light-sensing/charge-accumulation phase of operation.)

FIG. 3B is similar, but shows how the sampling interval may be shortened in circumstances of bright illumination or other condition (e.g., electronic ISO setting) that causes the sensor to accumulate charge over a shorter interval before being sampled. Each of the depicted row sampling intervals in FIG. 3B is 533 microseconds.

In the FIG. 3B case, the interval of overlap between successive rows is smaller than in FIG. 3A, since each row is exposed for a shorter interval. (The overlap between successive rows in FIG. 3A is 933 microseconds, vs. 400 microseconds in FIG. 3B.) This shorter interval of overlap means that a change in ambient lighting at a particular instant will be manifested in a lesser number of rows. For example, a flash of light striking the sensor during the FIG. 3A scanning will influence the output signals of 16 rows (i.e., the number of rows being exposed at one time, given a 66.7 microsecond delay between rows), but only 8 rows in FIG. 3B.

Moreover, the shorter the row-sampling interval, the more notable will be a given change in ambient lighting. For example, if the ambient illumination striking the sensor increases by 5% for a period of 100 microseconds, it will more strongly bias the output signal produced by affected rows in FIG. 3B than in FIG. 3A, since 100 microseconds is a longer fraction of the 533 microsecond sampling interval of FIG. 3B, than it is of the 1067 microsecond sampling interval of FIG. 3A. Such a change in lighting will thus appear in row-average data output from FIG. 3B with a higher signal-to-noise ratio than that output from FIG. 3A.

Figure 4:
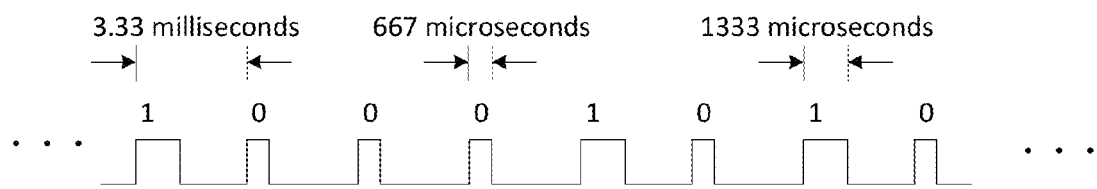
FIG. 4 shows light modulation to convey binary symbols.

FIG. 4 shows an illustrative modulation of the ambient light striking the sensor. Here, each symbol begins with a rising edge, with each short positive pulse signaling a "0" and each longer positive pulse signaling a "1." The shorter positive pulses are half the duration of the longer positive pulses. In this example a symbol is transmitted every 3.33 milliseconds (i.e., 300 bits/second). Each shorter positive pulse has a duration of 667 microseconds following its rising edge; each longer pulse has a duration of 1333 microseconds.

For sake of illustration, consider that the rising edge of an optical data symbol causes the ambient light striking the phone's camera to increase by 5 percent. If light sensed by each pixel is quantized into eight bits (0-255), and the ambient light causes the average row pixel to produce an output signal of 100, then such a row would produce an output signal of 105 if its full exposure period takes place while the ambient light is 5% greater.

The effect on the average output signal from a row will depend on when—during a rows' exposure interval—the rising edge of the data symbol occurred. If a row's exposure interval began just when the rising edge occurred, then the row's pixels would be exposed to the increased light for the full duration of their exposure, causing the row's output signal to increase to 105. If a row's exposure interval was just ending when the rising edge occurred, then the row's pixels would stop collecting charge just when the increase in light occurred, so the row output would still be 100. For rows between these extremes, the average row pixel output value would be between 105 and 100.

Figure 5:
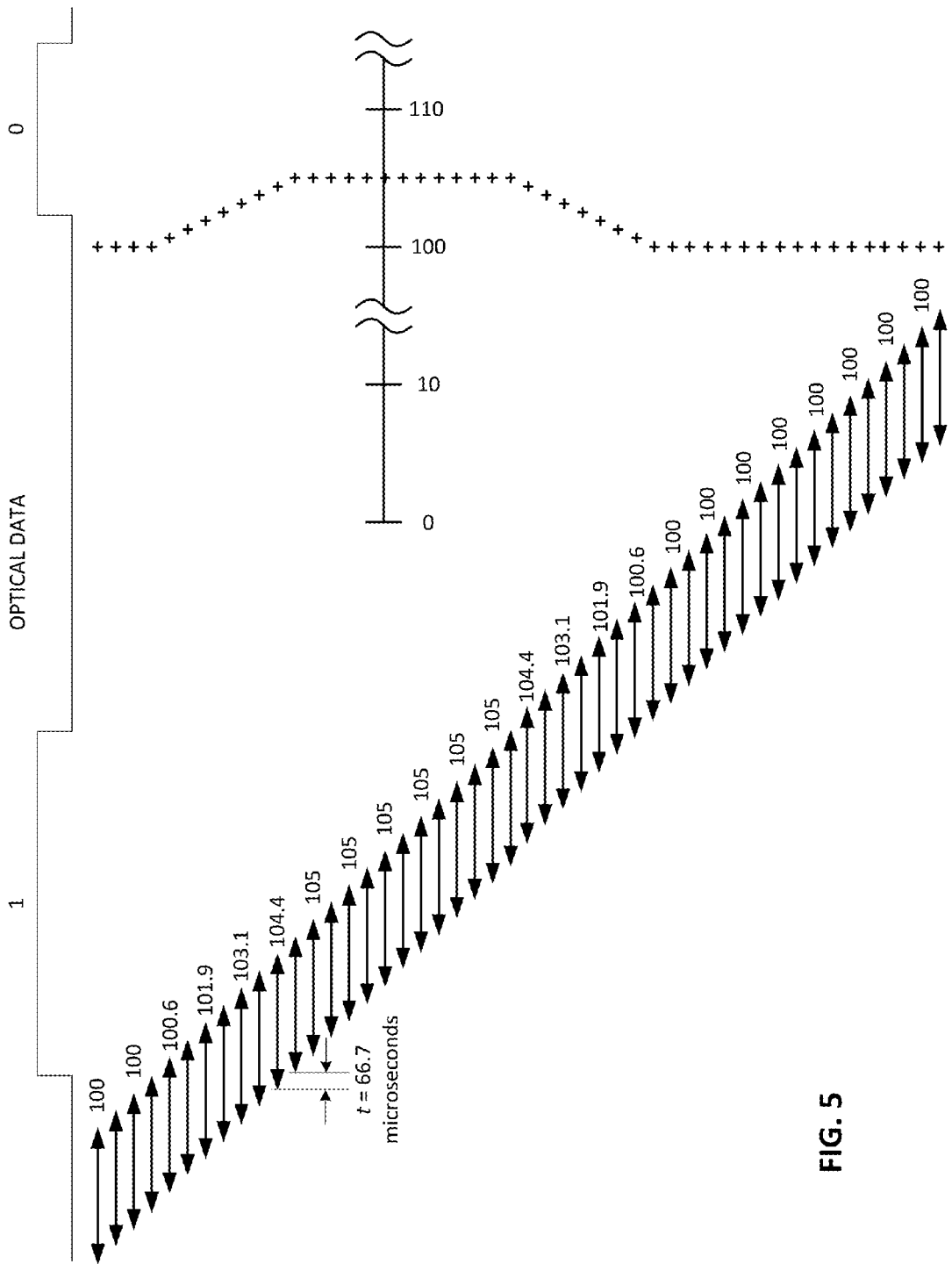
FIG. 5 more particularly illustrates how time-shifted sampling intervals of camera rows recovers optical data.

The foregoing is illustrated by FIG. 5. Here the horizontal arrows correspond to those of FIG. 3B, but more rows are shown. FIG. 5 also shows, along its top, the waveform of FIG. 4, on the same time scale as the horizontal arrows. The numeric value of the average output signal for the rows is also shown. (Due to space constraints, the output value for only every-other row is shown.) The plot of + symbols on the right shows the sampling of the ambient light by each row, in graph fashion.

As can be seen, the top rows have an average pixel output value of 100. When the ambient illumination increases with the rising edge of the top waveform, the average output signal gradually increases in successive rows—from 100 up to 105, as the increased illumination affects more and more of the rows' exposure intervals. It holds the value of 105 for many rows (i.e., all those rows whose exposure interval wholly occurs while the optical data has increased the ambient illumination). When the falling edge of the top waveform happens, the average output signals of the rows diminishes, from 105 back down to 100. Rows continue to output an average value of 100 until the next rising edge (not particularly shown in the rows of FIG. 5.) The square wave optical data signal is thus manifested in the row output data as a low pass-filtered square wave atop an average pixel output signal of 100, with gradual rise and fall transitions, instead of the sharp (high frequency) rise and fall transitions of the optical signal Desirably, the optically-transmitted message is encoded using an error-correcting coding, to allow robust recovery. Examples include Viterbi, BCH, Reed Solomon, convolutional and turbo codes, etc. Due to the redundancy of such codes, error-corrected throughput data is somewhat less; an illustrative embodiment may convey, e.g., 5, 20, or 100 bits/second of error-corrected data, instead of the underlying raw rate of 300 bits/second.

If the ambient light includes a light source that introduces a slowly time-varying modulation (e.g., imagery presented on a television screen), then high-pass filtering can be applied to the row-averaged output signal so as to mitigate such low frequency effects. Alternatively, an automatic gain control module can compensate for these slow variations in output signal, allowing the faster variations due to optically conveyed data to more readily be distinguished.

The resulting output signal may then be converted into the frequency domain by an FFT or the like, to identify the frequency(ies) of optical modulation. Based on which frequency(ies) are detected, the software discerns which of several candidate modulation protocols are present. Appropriate decoding then follows, which may include application of a tuned filter. Depending on the encoding scheme apparently used, the decoding may include application of an error recovery technique. (Turbo coding, BCH coding and Reed Solomon coding are examples of technologies allowing error recovery.)

Additional Information

As noted earlier, although a device camera may capture video at 30 frames per second, such imagery can be used to recover optical data at rates far in excess of this—because rows (lines) are captured at much higher rates than frames.

More particularly, light level is captured as a 1D signal (i.e., light level over time) using a 2D camera image operated in a video camera mode. The 1D signal is captured at a sample rate of the video camera's row rate (i.e., frame rate times rows-per-frame). As illustrated by the FIG. 5 example, each row's sample of the captured signal is inherently low-pass filtered due to the camera's aperture time, and may benefit by some further post-processing.

For video cameras with AGC, brighter images will reduce the aperture time and improve the frequency-response of the recovered signal content—the inherent low-pass filtering pole moves up in frequency.

Also the camera's spatial resolution can be traded-off for higher temporal resolution. This is best achieved by de-focusing the camera, or capturing the light-source from a diffuse or featureless surface, such as a blank wall The following discussion further considers row scanning, where each row's exposure is staggered relative to the preceding row (sometimes termed "rolling shutter").

Variable Exposure Time Based on Photon Capturing Time (Aperture Time)

In a particular embodiment, photons are captured by pixels in an individual row for the interval starting when the row of pixels has its row-reset signal removed, and ending when the accumulated charge data is read from that pixel row. (For each such individual row of pixels, no signal information is typically available during the sampling period while photons are being captured. Instead, only an aggregate sum of total accumulated photons is available at the end of the sampling interval.)

The signal information is found by measuring the variation from pixel-row to pixel-row down the image, since these are captured at successive moments in time. Signal levels on each row contain both scene/image content and variations in light intensity (modulation). For indoor video, light intensity is modulated at low frequency (50/60/100/120 Hz) from room lighting due to light levels changing at the frequency of the electricity supply. Flicker compensation for room lighting is often implemented in video cameras to mitigate this effect.

This light modulation can be taken to much higher rates. The video camera line rate is of the order: LinesPerFrame*FrameRate.

For example at VGA, 480 lines*15 fps=7200 Hz. For High Definition (HD) video, with 1080 lines at 30 fps, the video camera line frequency is 32400 Hz.

Within the camera, the photon capture time (aperture time) is adjustable from the longest, which is the reciprocal of the video frame rate (the time taken to read the whole frame), down to the shortest, the reciprocal of the video line rate (the time period from pixel row to pixel row being read from the camera sensor).

For a camera with Y rows of pixels, and a pixel row-to-row sampling offset time of t, and a row exposure interval E, the exposure interval can range from E=1 to E=Y, for a given value of t. (In unusual cases the sampling period may exceed E=Y, e.g., if there is an additional exposure time between frames being read, during which photons can be captured.)

When E>1, the optical temporal frequency response is reduced, and with it the signal to noise ratio (SNR).

Figure 6:
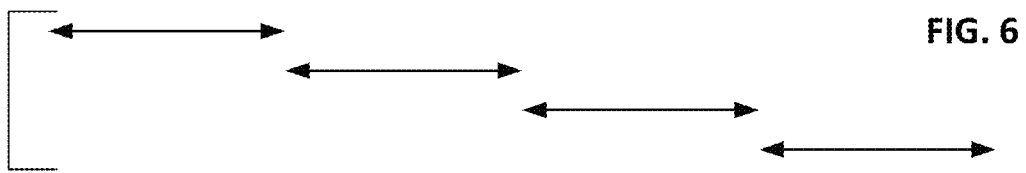
FIGS. 6-9 show different row-sampling relationships.

The best case is when E=1. In this case, the sampling apertures (during which photons are captured), are adjacent in time, and do not overlap. This is straightforward sequential sampling, and is illustrated by FIG. 6. The optical signal can be read directly from the samples (i.e., the average pixel values of the successive rows).

Figure 7:
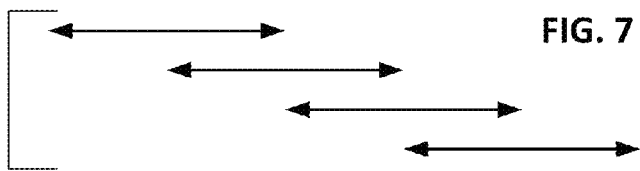

E=2 corresponds to the situation shown in FIG. 7, in which the sampling aperture for the period during which photons are captured overlaps 50% with the sampling aperture period for adjacent rows.

Figure 8:
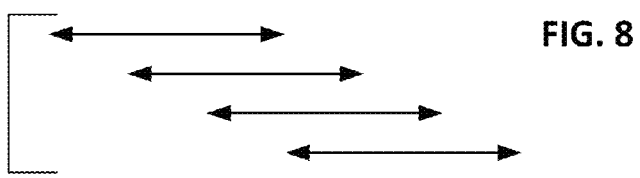

E=3 corresponds to the situation shown in FIG. 8, in which each row's sampling apertures overlaps 67% with the sampling aperture period for adjacent rows.

For large values of E (long exposure intervals), the sampling aperture period overlaps almost entirely with the aperture period for adjacent rows. This is shown in FIG. 9.

Figure 9:
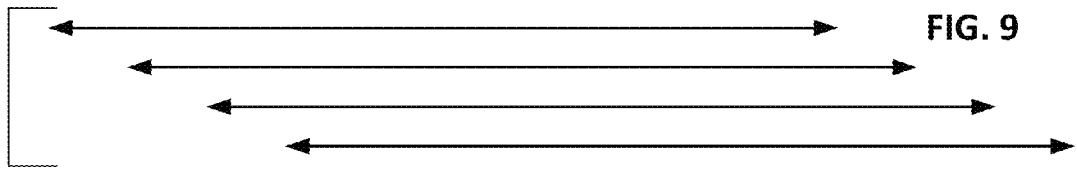

It will be recognized that data available from the rows of FIG. 9 has a poorer SNR than that available from the rows of FIGS. 6-8, due to the limited resolution of the A-D data conversion, and because photons for a particular instant of data signal are accumulated along with all other light for the extended exposure period.

It will also be appreciated that data for all pixels in each row contain accumulated photoelectric charge from a window in the time domain. This sampling window is a sliding window that advances in time by t from row to row down the frame.

To optimize signal recovery, the imaging sensor can be configured to shorten the sampling apertures, and reduce the time-overlap with adjacent rows.

In the FIG. 5 example, discussed earlier, the symbol period (3.33 milliseconds) is much smaller than the camera frame period (33.3 milliseconds), but is much greater than the row exposure interval (533 microseconds). Decoding in such case is relatively straightforward, as discussed above.

It is possible to use still higher data rates, e.g., in which the symbol period is smaller than even the row exposure interval. For example, the symbol period may be 200 microseconds (corresponding to a raw bit rate of 5,000 bits/second). This is illustrated in FIGS. 10A and 10B.

In this embodiment, each row has an exposure interval of 500 microseconds. The same data signal as in FIG. 4 is utilized, but much faster. The symbols occur every 200 microseconds. A "0" is represented by a pulse width of 40 microseconds; a "1" is represented by a pulse width of 80 microseconds.

Figure 10A:
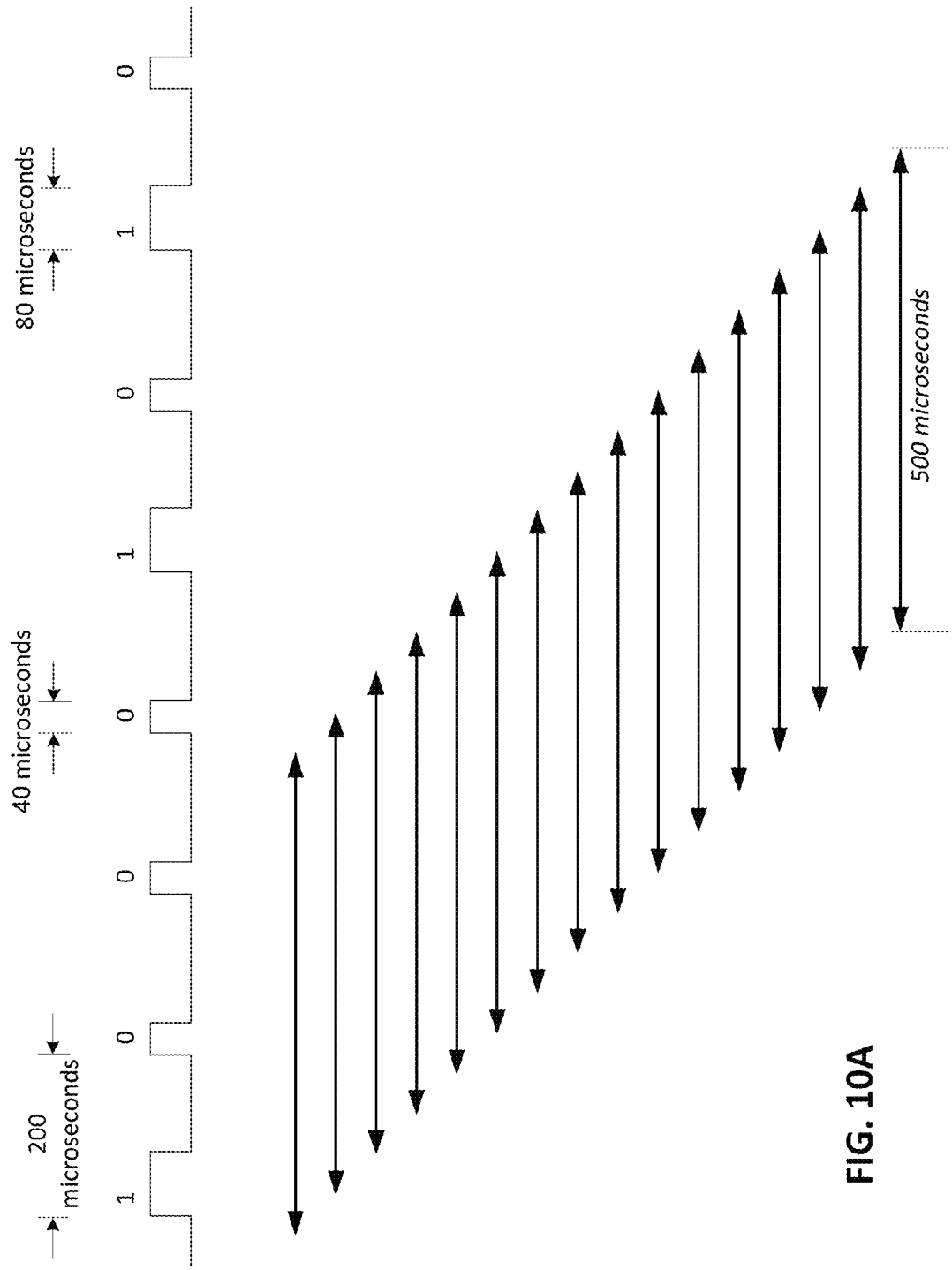
FIGS. 10A and 10B illustrate that the data period can be less than the row sampling interval.
Figure 10B:
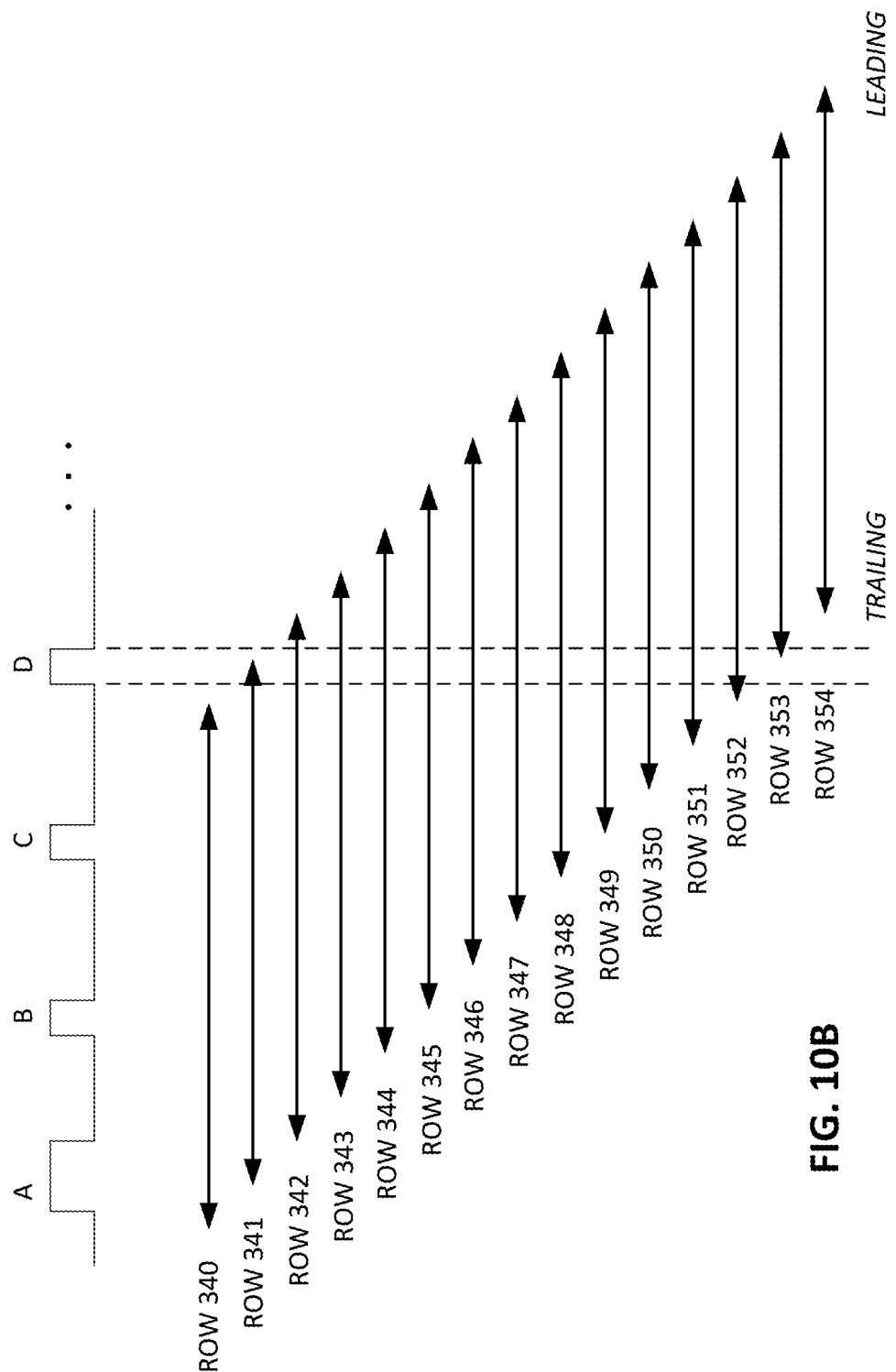

FIG. 10B focuses on a subset of FIG. 10A, and assigns letters to the different pulses in the optical signal train, and row numbers to the different rows.

Each successive row spans an advancing interval of time. The depicted rows may be regarded as time windows, each having a "leading" part on the right, which encompasses instants of optical data never before sampled. Conversely, each time window has a 'trailing" part on the left, out of which instants of optical data that have been sampled by many prior rows exit.

In particular, consider the pulse D. The output signal from Row 340 is not influenced by pulse D. Row 340 started and ended its charge accumulation window before pulse D begins.

In contrast, the charge accumulation period of Row 341 spans the instant that pulse D arises (but not the instant when pulse D concludes). Accordingly, the output signal from Row 341 reflects part of the light in pulse D. All other things being equal, the output signal from Row 341 is slightly larger than the output signal from Row 340, due to capture of part of the light from pulse D.

By Row 342, pulse D has terminated. The charge accumulation window of Row 342 was active for the whole period of the pulse, so its light is fully reflected in the output value from Row 342.

The same is true for Rows 343-352.

At Row 353, pulse D begins to fall out the trailing part of the window. That is, the charge accumulation period for Row 353 ends during the middle of pulse D. Thus, all else being equal, the output signal from Row 353 will drop somewhat relative to Row 352, since the exposure interval didn't capture the full pulse.

Row 354 reflects no signal due to pulse D; the pulse ended before the charge accumulation interval began. Again, the output signal from Row 354 will be somewhat less than that from Row 353 for this reason.

From the foregoing it will be recognized that the entry of a pulse in the leading edge of one row's exposure window, corresponds to the exit of that pulse from the trailing edge of another row's exposure window, 12 rows later (ignoring edge-of-sensor cases). These events are correlated. Every entry of a pulse in one row's exposure window is matched—

12 rows later—by exit of that pulse from another row's exposure window. An increase in the output signal of the former row due to entry of the pulse, correlates to a decrease in the output signal from the latter row due to exit of that pulse.

A modified correlation detector can look for these correlated events. However, instead of looking for correlated changes of the same type (sign), it looks for correlated changes of the opposite type. If one row increases in value (compared to its predecessor), and 12 rows later another row decreases in value by a like amount (compared to its predecessor), this signals that a positive pulse is entering the former sample window, and exiting the latter.

By such arrangement, the pulses A, B, C, D, etc., of FIG. 10B can be detected, even though the sampling interval of each row is many times longer than any pulse.

(The timing shown in FIGS. 10A and 10B technically runs afoul of the Nyquist sampling theorem, because the 40 microsecond "0" pulse is illustrated to be shorter than the stagger interval between onset (and conclusion) of the 500 microsecond capture intervals. (This stagger interval is approximately 42 microseconds in the depicted waveforms.) Thus, aliasing can occur. The reader is asked to forgive this bit of artistic license, and is trusted to comply with Dr. Nyquist's law when actually implementing this technology. For example, an implementation that employs a 60 microsecond pulse to represent a "0" and a 120 microsecond pulse to represent a "1" would so-comply.)

While the foregoing refers to a modified correlation detector, the artisan will recognize that the task can similarly be viewed as one of deconvolution, and the optical pulse train can be recovered by deconvolution principles instead.

The equation from which a deconvolution can be constructed is easily found. The governing equation is R*s=a, and is shown in matrix form below.

The large matrix represents the rolling shutter's aperture function (and may thus be termed "R"). Each row of the matrix corresponds to a row of the image sensor, and columns represent successive points in time. The "1"s in each row indicate the times when sensors in that row are actively accumulating charge (i.e., the aperture is active). As can be seen, the intervals of charge accumulation are staggered by one column's time period, row-to row.

The "s" vector is the value of the ambient light signal as a function of time (e.g., the waveform at the top of FIG. 10A). This is what we ultimately want to solve for.

The "a" vector comprises the resulting average output signals measured from the rows of image sensors.

$$\begin{bmatrix} 1 & 1 & 1 & 1 & 1 & 1 & 0 & 0 & 0 & 0 & 0 & 0 \\ 0 & 1 & 1 & 1 & 1 & 1 & 1 & 0 & 0 & 0 & 0 & 0 \\ 0 & 0 & 1 & 1 & 1 & 1 & 1 & 1 & 0 & 0 & 0 & 0 \\ 0 & 0 & 0 & 1 & 1 & 1 & 1 & 1 & 1 & 0 & 0 & 0 \\ 0 & 0 & 0 & 0 & 1 & 1 & 1 & 1 & 1 & 1 & 0 & 0 \\ 0 & 0 & 0 & 0 & 0 & 1 & 1 & 1 & 1 & 1 & 1 & 1 \end{bmatrix} * \begin{bmatrix} s1 \\ s2 \\ s3 \\ s4 \\ s5 \\ s6 \\ s7 \\ s8 \\ s9 \\ s10 \\ s11 \\ s12 \end{bmatrix} = \begin{bmatrix} a1 \\ a2 \\ a3 \\ a4 \\ a5 \\ a6 \end{bmatrix}$$

Each side of the equation can be multiplied by the pseudo-inverse of the R matrix (R'). This yields the "s" vector on the left, and aR' on the right. Given the regular structure of the matrix R, various numerical optimizations can be applied in the solution. Moreover, the solution may be in the form of a smooth curve, rather than the crisp pulses of the original signal. Filtering and/or thresholding can convert the former into the latter.

(It will be recognized that the equation shown above represents only a small part of the system, which typically includes a sensor with hundreds or thousands of rows, and a like number of columns.)

The artisan will recognize that convolution in the time domain corresponds to multiplication in the frequency domain. So another solution operates by transforming the respective variables to the frequency domain (e.g., by an FFT), and proceeding on this basis. (This approach is not entirely analogous, because the cyclical nature of the FFT assumes a "wrapping" from beginning back to the end. Rolling shutter sensors do not normally wrap seamlessly in this fashion, so the solution typically employs a windowing function with zero-padding at the ends to model a single-scan of the sensor rows.)

In still another arrangement, detection can be based on cross-correlation or autocorrelation. The former employs knowledge about the symbols expected to be received (e.g., a 667 microsecond pulse or a 1333 microsecond pulse, every 3.33 milliseconds, in FIG. 4), and correlates the row data with such patterns to identify their occurrence. When the correlation value exceeds a threshold, the corresponding symbol is deemed to have been detected.

Cross-correlation does not require a priori information about the timing of the expected data signals (although such information can be used to advantage). Instead, the pattern of row data is examined for self-similarity over time, to discern the occurrence of recurring symbols. Again, if a threshold metric is exceeded, the detected occurrences are regarded as desired data signals. In a particular embodiment, the output of a cross-correlation detector varies between 0 and 1 depending on whether the current signal exceeds the threshold amount of correlation with a prior signal.

An illustrative embodiment transmits the optical data by cycling an LED on and off (i.e., 100% amplitude modulation). In practice, it is sometimes desirable to modulate at less than 100%, to reduce perceptibility. (While such high data rate flicker is normally not perceptible, with motion and eye saccades, such flickering can lead to perceptible—and annoying—artifacts.)

Another modulation approach is to modulate colors differentially between color channels (e.g., red/green/blue). For example, the luminance of the signaling light can be kept constant, but its color composition switched to convey data.

As a simple example, in the YUV color space, weighted values of red, green and blue are summed to produce "Y"—a measure of luminance/brightness, as perceived by the human eye. Green is weighted 59%, red is weighted 30% and blue is weighted 11% (i.e., the eye is much more sensitive to green than to blue). In one data state (e.g., the off state in the FIG. 4 signal), green at an intensity of 1.0 is used, resulting in an apparent luminance of 0.59. In another data state (e.g., the on state of the FIG. 4 signal), red at an intensity of 2.0 is used, resulting in a luminance of 0.60. Switching between these states leaves the net luminance essentially unchanged to human observers. Yet the phone camera samples red, green and blue by different pixels, so such chrominance modulation can readily be detected from the row output data.

(While chrominance modulation that maintains substantially constant luminance levels avoids many flicker artifacts, some moving objects may develop rainbow hued edges.)

It will be understood that the pulse width modulation shown in FIG. 4 is illustrative, but many other forms of modulation can be employed. These include pulse amplitude modulation (PAM), pulse position modulation (PPM), etc. The form of encoding is similarly a choice for the designer, and can include NRZ, Manchester-encoding, PSK, FSK, QAM (single or two color light sources), etc.

Variations and combinations of the foregoing can also be used. For example the optical data transmission source (e.g., an LED) can encode its output at one of multiple levels per pulse period, e.g., out of 256 levels of light—instead of simple bi-level switching, thereby enabling greater data rates. This can be combined with multiple color channel data transmission, enabling still greater data rates.

As noted earlier, automatic gain control (AGC) can vary the row exposure interval, in accordance with scene brightness. Variations in exposure interval due to AGC can be sensed in software, and corresponding corrections can be applied to the row output data to counteract such changes, if desired.

While not readily suitable for current mass-market smartphones, temporally-coded aperture techniques can be used in some embodiments, e.g., to mitigate the effects of background imagery. (Existing camera sensors typically open the aperture by disabling the reset signal to the row's pixels, and then close the aperture by sampling the pixel data for the row, e.g., into an output CCD bucket-brigade chain).

One way of implementing a temporally coded aperture is by coupling each photodiode via a switch to a storage capacitor. Each photodiode is also coupled to a reset/clamp transistor, which prevents charge from building up in the diode when the diode and capacitor are disconnected. The capacitor is read using a buffer (e.g., a source follower transistor) in a manner similar to conventional designs. During exposure time, the aperture is switched on and off by connecting and disconnecting the photo diode and capacitor, and simultaneously unclamping/clamping the diode to a reset rail. Charge is thus only accumulated for isolated periods during the row's nominal exposure interval. After charge is accumulated, the pixel rows are read, per normal. The transistors are then both enabled to reset both the photodiode and capacitor.

Such aperture coding modulation can be done on the whole frame simultaneously, or on a per-row basis, with the modulation pattern synchronized individually with each row's exposure aperture.

Figure 11:
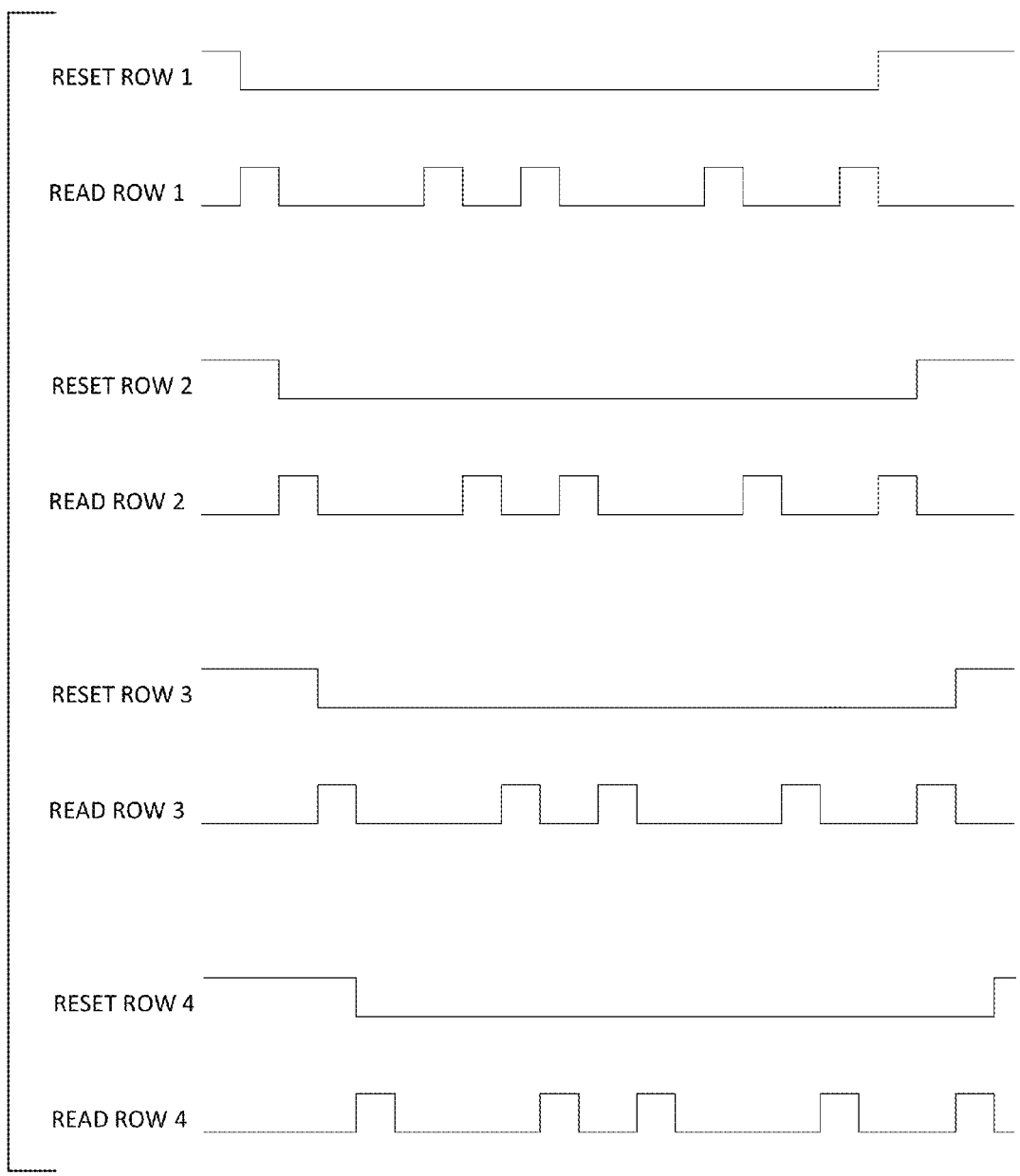

Another approach (again, requiring modified hardware compared to existing cameras) is to read the data from each of the pixels at multiple different instants, without resetting in-between. A timing diagram for such an arrangement is shown in FIG. 11. (The row resets when the reset signal is high.)

Depending on hardware constraints, it may be desirable to select a reading pattern in which no two rows need reading at the same time. Desirably the reading pattern within the row's nominal sampling interval is aperiodic. That is, it does not have elements that autocorrelate with each other.

In the FIG. 11 embodiment, because pixel data is read multiple times per row to effect a coded aperture, a slower overall frame rate may be necessary in order to support enough row read time periods.

(Rows may be reset between each "coded" sampling/read, but the time required for full reset may be long enough to interfere with intended operation.)

It may be recognized that such coded aperture approaches build on the FIGS. 10A/10B arrangement. In FIGS. 10A/10B, signals were essentially detected by their entry into, and their exit from, the exposure interval of a row. That is, only two features of the window are useful in detecting data symbols. With temporally coded aperture approaches, in contrast, there are multiple such features that can be leveraged to detect the data symbols, namely each in-row read sample.

Color Imaging with Monochrome Sensors

In accordance with another aspect of the technology, color imaging is achieved with monochrome sensors.

In one such embodiment, differently colored LEDs (or other light sources, e.g., lasers) are successively operated (e.g., strobed to illuminate the viewing space) in synchrony with the exposure intervals of different sensor rows.

For example, if there is no temporal overlap between exposure intervals of the rows (e.g., as shown in FIG. 6), rows 1, 4, 7, etc., can be exposed under red illumination; rows 2, 5, 8, etc., can be exposed under green illumination, and rows 3, 6, 9, etc., can be exposed under blue illumination. In the next frame, row 1, etc., can be exposed with red, etc., and in the following frame, row 1, etc., can be exposed with blue. This cycle can repeat.

If there is temporal overlap between the rows' exposure period, then corresponding adjustments can be made. For example, in the row overlap situation depicted in FIG. 8, row 1 can be exposed under red illumination; row 4 can be exposed under green illumination, and row 7 can be exposed under blue illumination, etc. (Row 2 is exposed mostly with red and partly with green; row 3 is exposed partly with red and mostly with green. Similarly, row 5 is exposed mostly with green and partly with blue; row 6 is exposed partly with green and mostly with blue. Etc.)

In other arrangements the same color illumination is maintained for several successive rows. For example, in FIG. 6, red illumination can be used for rows 1-4, then green for rows 5-8, and then blue for rows 9-12, with such pattern repeating.

In still other embodiments, only two colors of illumination (e.g., red and green) are alternately employed in exposing one frame, and a different pairing of colors (e.g., red and blue) is used in a successive frame, and a third pairing of colors (e.g., green and blue) is used in a following frame.

In yet other arrangements, one or more complete frames can be sampled under red illumination, followed by one or more under green illumination, and followed by one or more under blue illumination.

Figure 12A:
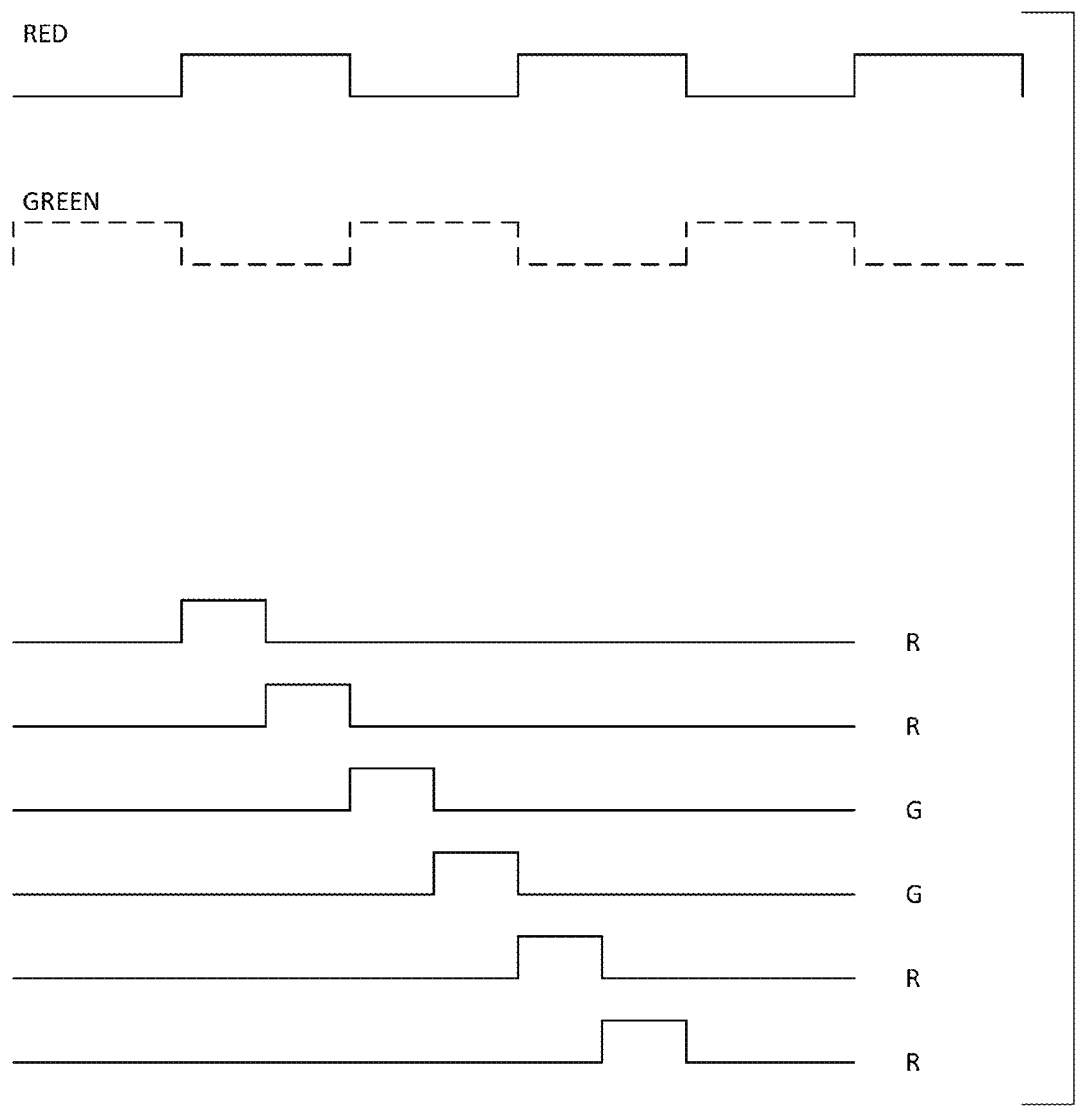
FIGS. 12A-12E illustrate aspects by which color imagery can be produced using monochromatic image sensors and controlled illumination.
Figure 12B:
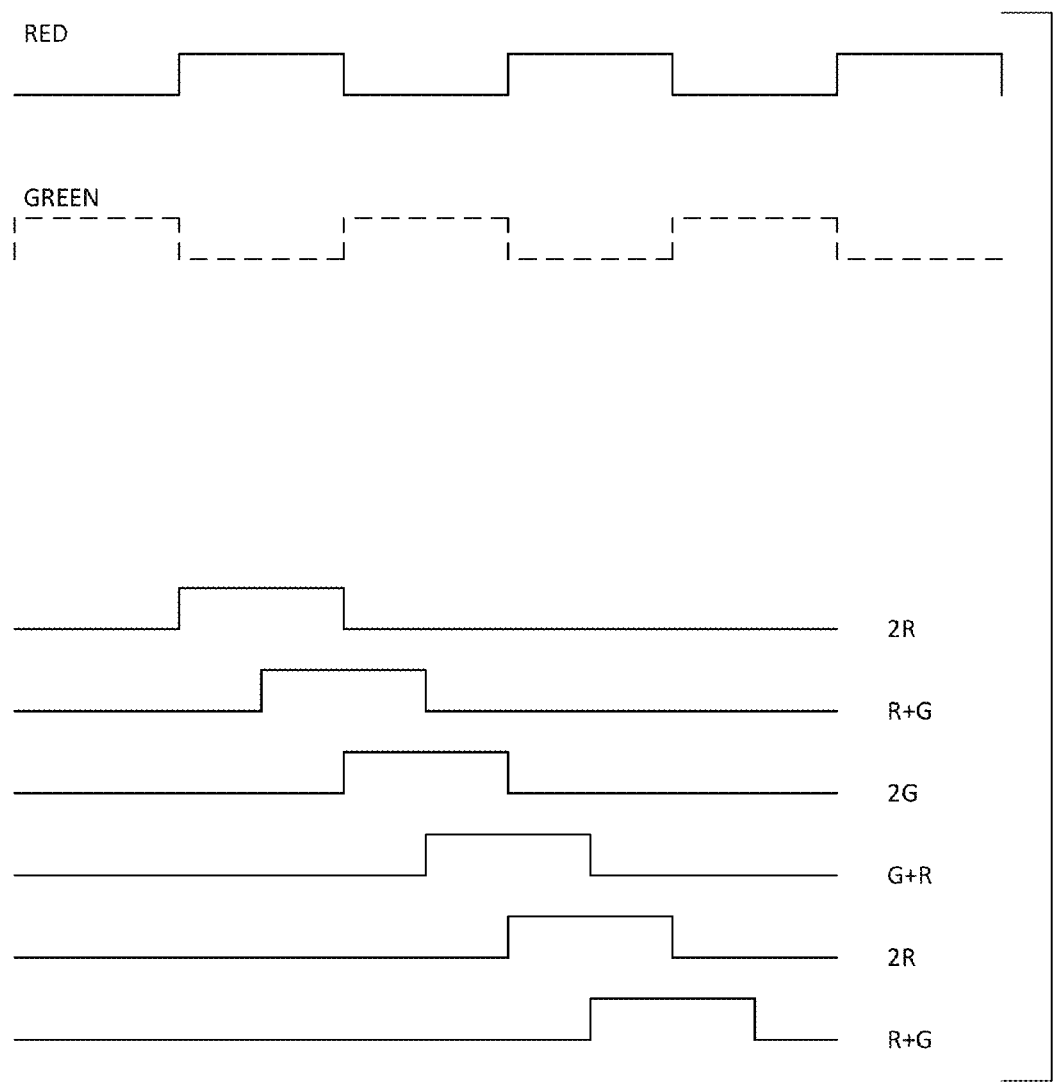
Figure 12C:
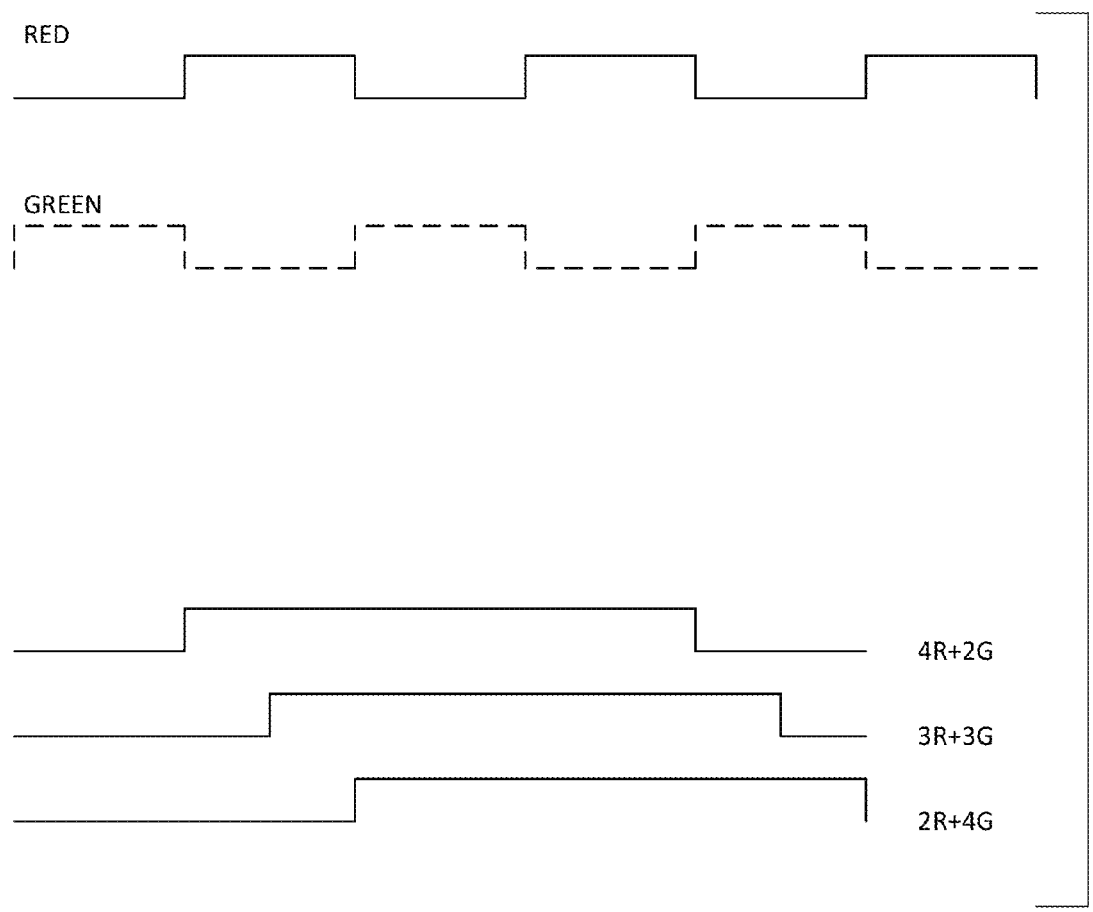
Figure 12D:
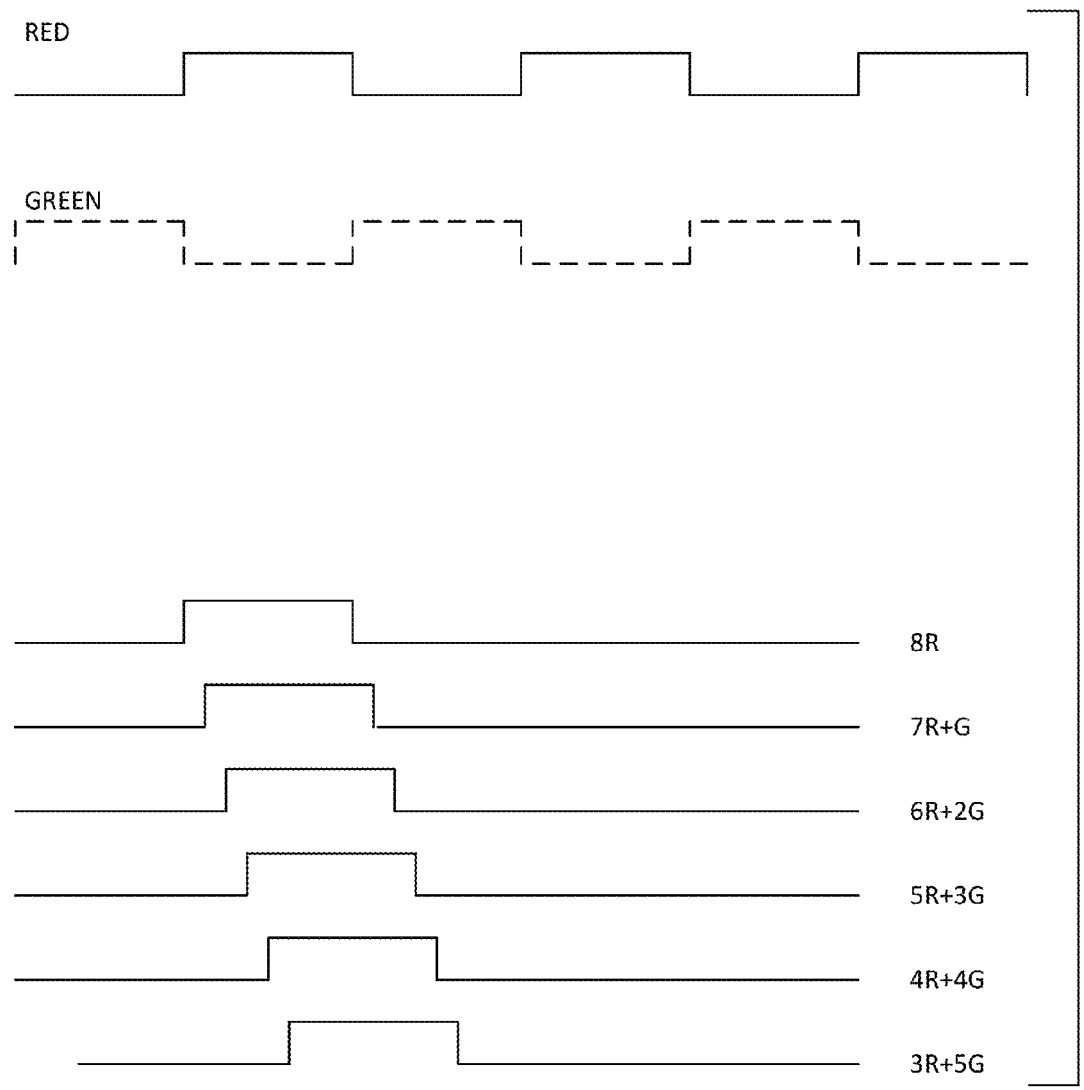
Figure 12E:
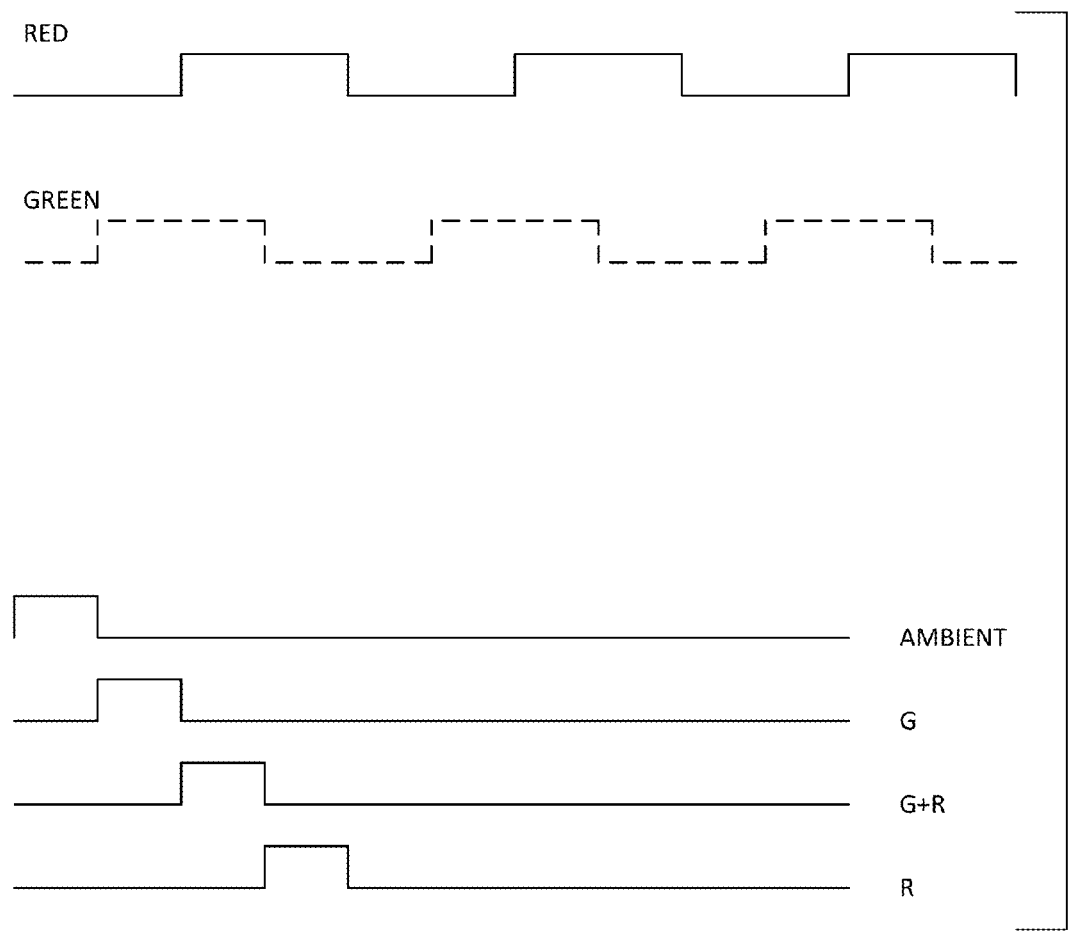

Additional variations are detailed in FIGS. 12A-12E. All of these alternate a periods of red illumination with a period of green illumination. In FIG. 12E, the red and green overlap.

FIG. 12A shows that successive multiple rows are exposed under the same illumination.

FIG. 12B shows that the row exposures can overlap, with some rows spanning two successive illumination colors. Here, the first row receives only red illumination; row 2 receives red+green, etc. The integrated amount of red in the first row is twice that in the second, so it has a value of 2R. (The second row has the value R+G.)

These types of patterns can be extended to retain some R+G exposure difference per line over the whole image, as shown in FIGS. 12C and 12D.

Variations with less spatial (and thus temporal) separation can have greater than +/−1. Red/Green modulation, with a tradeoff in spatial color resolution. (Low spatial color resolution may be acceptable for low density color-space watermarks for example.) Same is shown in FIG. 12D.

In FIG. 12E, the red and green overlap.

In all the above arrangements white light can be included in the illumination sequence, as can a third or more other colors.

Data produced by the monochrome sensor in the foregoing lighting environments can then be processed to compile color information for each pixel in the image—resulting in full color imagery in some implementations.

(It will be recognized that certain of the foregoing embodiments have similarities to RGB LED lighting in flatbed scanners using CIS CMOS/CCD imaging sensors.)

Control of the light color can be effected based on a signal from the camera driver (or by supplementary logic that taps off the camera control signals.)

The light sources in the foregoing arrangements needn't be red, green and blue, they can be, e.g.:
- white/white+color, for normal illumination and specific color enhancement;
- color1/color1+color2;
- color1/color2;
- multiple different colors in groups or sequences, IR, NIR, R, G, Y, B, V, UV;
- Subtle variations in color LEDs (e.g. 520 nm & 525 nm);
- Room illumination hue modulation for RGB-based color-adjustable room lighting;
- R, G, B individually modulated (e.g., from slight time-based modulation, to 100% amplitude modulation).

In embodiments employing multiple light sources, one color channel can serve as a clock signal (e.g., for detector synchronization), and another can serve as a synchronous data channel.

By such arrangements, inexpensive, monochrome (achromatic) CCD/CMOS cameras can be used for spectral observation and full color imaging. One of many applications of such technology is in reading digital watermark data, e.g., that is embedded in chrominance information. (Same is taught, e.g., in patent publication 20100150434.)

A particular implementation is a portable device (e.g., a smartphone) that has multiple colored LEDs that are controllably operable as the device "torch" to illuminate the scene captured by the device camera. Such integration simplifies coordination between the illumination and the data capture.

Other Comments

Having described and illustrated the principles of this inventive work with reference to various examples, it should be recognized that the technology is not so limited.

For example, while the detailed embodiments employ light emitting diode-based light sources, this is not essential. For example, projectors (e.g., DLP projectors) sometimes employ laser light sources (which may not be LED-based). Tungsten and other incandescent light sources can also be used. In some implementations, an electronic shutter or other opto-electronic modulator can be used in conjunction with a static light source so as to vary the luminance or chrominance output.

Similarly, while certain embodiments focused on conveyance of a cryptographic secret between devices (e.g., a network password), other information can additionally or alternatively be conveyed. One is an SSID identifier, to facilitate network log-in. Another is data identifying other parameters of device communication. For example, a home thermostat may both convey its own PIN code, and also specify that it is equipped to communicate using Bluetooth. Essentially any digital data can be optically conveyed to the phone (and optionally sent by the phone to another destination using another transmission medium), using the technologies detailed herein.

The optical control signal output by a device 10 may be conveyed to an optical emitter by various means. Physical wiring can, of course, be used. But so, too, can the output information be conveyed wirelessly to a device with an optical emitter (or to a device that is linked to a device with an optical emitter).

The wireless networking can be of any sort presently known or hereafter developed. The mentioned WiFi, Bluetooth and Zigbee technologies are just a few current examples.

In some embodiments, the secret may be conveyed in the payload of a watermark applied to an image or video. In some such cases, a focused camera may be used to gather image data from which the watermark payload is recovered. Exemplary watermarking techniques are taught in U.S. Pat. Nos. 6,590,996, 6,865,589, 7,996,678, 20100150434, 20090220070 and 20060133647; others were mentioned previously.

The present technology can be adapted to systems that don't have optical emitters by use of printed barcode or digital watermark labels that convey the secret data.

While reference has been made to embodiments allowing visitors to easily log into home and office networks, it will be understood that different privileges can be afforded to different users on such networks through use of conventional technology. For example, a guest to a home may interact with a television to pause playback of a movie, but not change program recording operations or reconfigure the network.

The secret data conveyed by implementations of the present technology needn't be static. Different devices may employ passwords or other secrets that are changed over time, e.g., every hour, day or month. Unless a cooperating device has received the latest password, it is prevented from interacting with the protected device.

Artisans should understand that the references herein to "light" and "optical," etc., refer to electromagnetic radiation having wavelengths in the far infrared range and shorter (i.e., less than 1 mm). This range includes the visible light range (i.e., about 390 to 750 nm.).

While the detailed embodiments contemplate that a phone can read-out only a single row of pixel data at a time, in other embodiments parallel architectures can be employed—allowing multiple rows to be read-out in simultaneous or overlapped time. It will be recognized that principles of the present technology can be adapted to such embodiments. As long as two or more different parts of a frame collect light during different instants of time, then such difference can be leveraged to extract optical information having a data rate greater than the video frame rate (in a monochromatic implementation).

Reference was made, above, to embodiments that maintain luminance at substantially constant values (while switching chrominance). The bounds of "substantially constant" are application dependent. In some embodiments, luminance variations of 50% or less may be regarded as "substantially constant." In others, variations of less than 20%, 5%, or 2% may be employed.

The data rate information provided herein (e.g., data rates in excess of frame rates or row rates) is based on greyscale, or monochromatic, imagery. These rates can be doubled or tripled by sending part of the data in the red channel, part in the green, and part in the blue. Smartphone image sensors typically have color image sensors, such as using color filter arrays (e.g., Bayer), or Foveon technology. (In the former case, each row has two colors of pixels: red/green, or blue/green.) Data from the red pixels can be processed to recover data sent in the red chrominance channel, and likewise for green and blue. Thus, data rates in excess of 60 or 90 symbols per second can be achieved in some embodiments (using cameras operating at 30 frames per second), and rates in excess of 28,800 or 43,200 symbols per second can be achieved in others (using cameras operating at 480 rows per second).

Another application of the detailed technology is in forensics. LED or other lighting can be used to illuminate the environment with a temporal light pattern that serves as an optical fingerprint (e.g., a unique key) indicating a particular place and/or time. Video (or still pictures) taken under this lighting manifest this fingerprint pattern, enabling the place and time the imagery was captured to be discerned. This is useful, e.g., in tracking leaked footage from inside secure facilities.

Sometimes information about operation of a phone's camera subsystem is not readily available. In such case, same may be reverse-engineered. For example, the dead-time between capture of successive video frames can be discerned from output video file information, or from timing information from the camera's device driver or operating system.

While detailed functionality of certain of the above-described embodiments can be realized by, e.g., app software in a smartphone, in other embodiments such functionality can be provided otherwise, such as by operating system modules in a smartphone, code executing on a remote computer, etc.

Just as some digital cameras and camera apps have a "face detect" feature that alerts the user when an apparent face has been discerned in an image frame (often highlighting same with a graphical indicia, such as a bounding box), so too can embodiments of the present technology have a "data detect" feature. Such a feature can alert the user that lighting sensed by the camera seems to be conveying serial digital data. A user interface can graphically highlight one or more regions of the image frame where such data is particularly sensed (e.g., based on a spatial SNR map for the detected data within the image frame), so that the user can direct the camera in such direction. Either in response to user instruction, or automatically, the camera can change its focus to optimize detection of the data signal (e.g., defocusing objects in the viewing field to give better temporal resolution than spatial resolution).

In a variant embodiment, the device user interface can indicate one or more regions of the image frame where such data is difficult or impossible to detect, so that the user can direct the camera away from such direction.

While the foregoing disclosure focused on smartphone-based embodiments, it will be recognized that this technology finds utility with all manner of devices—both portable and fixed.

Particularly contemplated smartphones include the Apple iPhone 5, and smartphones following Google's Android specification (e.g., the Verizon Droid Eris phone, manufactured by HTC Corp., and the Motorola Droid 3 phone).

(Details of the iPhone, including its touch interface, are provided in Apple's published patent application 20080174570.)

The design of smartphones and other devices referenced in this disclosure is familiar to the artisan. Each commonly includes one or more processors, one or more memories (e.g. RAM), storage (e.g., disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, CDMA, W-CDMA, CDMA2000, TDMA, EV-DO, HSDPA, WiFi, WiMax, Zigbee or Bluetooth, and/or wired, such as through an Ethernet local area network, a T-1 internet connection, etc.).

Figure 13:
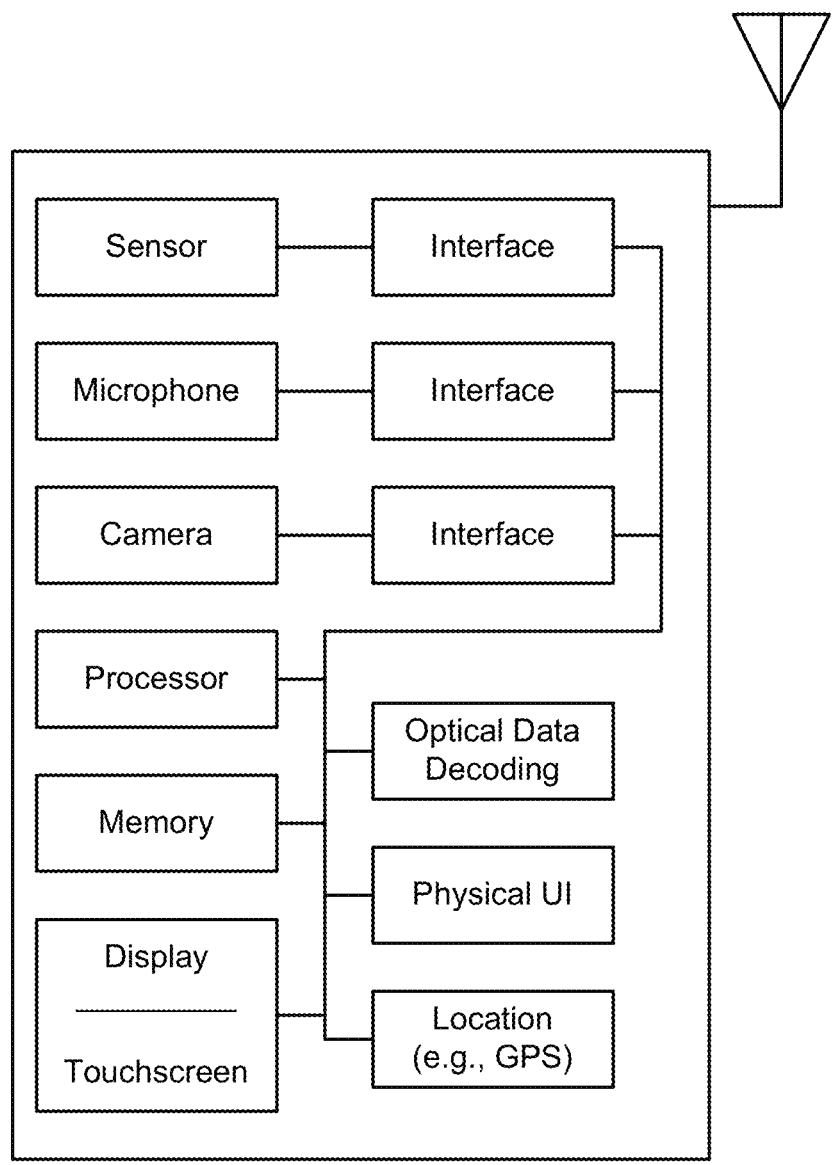
FIG. 13 is a block diagram of a smartphone, which can be used in embodiments of the present technology.

A block diagram of an illustrative smartphone is shown in FIG. 13. In this diagram a module is separately identified for optical data decoding. This module, which can be implemented in software, hardware, or a combination, performs the operations detailed earlier to recover a data stream from row data output by the smartphone camera.

The processes and arrangements detailed in this specification may be implemented as instructions for computing devices, including general purpose processor instructions for a variety of programmable processors, including microprocessors (e.g., the Atom and A5), graphics processing units (GPUs, such as the nVidia Tegra APX 2600), and digital signal processors (e.g., the Texas Instruments TMS320 series devices), etc. These instructions may be implemented as software, firmware, etc. These instructions can also be implemented in various forms of processor circuitry, including programmable logic devices, field programmable gate arrays, field programmable object arrays, and application specific circuits—including digital, analog and mixed analog/digital circuitry. Execution of the instructions can be distributed among processors and/or made parallel across processors within a device or across a network of devices. Processing of data may also be distributed among different processor and memory devices. "Cloud" computing resources can be used as well. References to "processors," "modules" or "components" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc. Phones and other devices according to certain implementations of the present technology can include software modules for performing the different functions and acts.

Known browser software, communications software, and media processing software can be adapted for many of the uses detailed herein.

Although features and arrangements are described, in some cases, individually, applicant intends that they also be used together. Conversely, while certain systems are detailed as including multiple features, applicant conceives that—in other embodiments—the individual features thereof are usable independently.

Similarly, while this disclosure has detailed particular ordering of acts and particular combinations of elements, it will be recognized that other contemplated methods may re-order acts (possibly omitting some and adding others), and other contemplated combinations may omit some elements and add others, etc.

Likewise, aspects of the different embodiments can readily be changed and substituted.

Although disclosed as complete methods, sub-combinations of the detailed arrangements are also separately contemplated.

Similarly, while detailed as methods, it will be recognized that the present technology also includes systems for performing the acts of the methods, and computer-readable media containing software instructions to configure hardware to perform the methods.

The assignee's patent application Ser. No. 13/299,140, filed Nov. 17, 2011 (now published as application 20120208592), further details conveyance of data by LED-based ambient lighting, using the JenNet IP6 system noted above, and receipt of such data by smartphone devices. That patent application also details a variety of other novel smartphone interaction techniques, with which the present technology can be combined. (So, too, do applications 20110212717 and 20110161076.)

Patent publication 20090129782 shows an office network in which data is conveyed through LED lighting.

Patent publication 20100261465 details how a smartphone can establish wireless communications with thermostats, parking meters, and other devices, and control same via a smartphone UI, through use of the smartphone camera.

Other patent documents concerning rolling shutter and related technology include U.S. Pat. Nos. 7,223,956, 8,150,255, 8,279,138, 8,334,898, and 20100171875.

It will be recognized that implementations employing the above-described optical technology for cryptographic key conveyance offer a variety of advantages over acoustic-based approaches. In one respect, this is due to the fact that homes and offices are relatively quiet, in an optical noise sense. Ambient illumination is normally constant in amplitude and spectral character. A few noise spurs (e.g., due to 50/60 Hz electrical excitation of some lamps, higher frequency excitation of other lamps, and screen refreshing of certain displays) can readily be discerned and adaptively filtered if desired.

To review, a few of the novel arrangements encompassed by the present technology include the following:

A first network device that includes a network interface, a processor, and a memory, where the memory stores secret data enabling networking with a second network device, and the device further includes an output through which the secret data is conveyed for emission as an optical signal. This output may be adapted for coupling to a separate device that includes an optical emitter.

A method performed in a first wireless device, which includes reading secret data from a memory in the device, and outputting this data for emission as an optical signal. Such method can further include establishing a secure wireless connection between the first wireless device and a second wireless device as a consequence of optical emission of the data. It may also include controlling a light source (e.g., in chrominance or brightness) in accordance with the output data. This light source may be of various types, including an LED-based system for building illumination, or an electronic display device that is simultaneously presenting imagery for human viewing, Another method involves a smartphone camera pointed at a subject, where focus is set to the subject is unfocused. Data captured by the camera is processed to derive a cryptographic key, which is then used in engaging a remote device in a secure wireless transaction.

A further method employs a smartphone video camera device that captures N frames per second of imagery (where each frame comprises plural rows of pixel data). The method includes processing (e.g., averaging) rows of pixel data to yield a time-varying output signal, and then discerning from this output signal a data signal that conveys more than N symbols per second. This data signal can be used in a cryptographic protocol to establish a secure session between two devices on a network.

Such a method may be separately practiced on pixels of two or three different colors in each row, to effectively double or triple such data rates.

The smartphone camera sensor may output M rows of imagery per second. Such row data can be processed to discern data signal that conveys more than M symbols per second. (Again, double or tripling of such data rates can be achieved by use of different chrominance channels.)

A related method of optical signaling uses a portable device camera in which rows of pixels are operated in a rolling shutter fashion (i.e., not all parts of a captured image are recorded at the same time). The camera captures frames of imagery in a video mode at N frames per second, and the captured rows are processed to extract an optical data signal having a data rate greater than N symbols per second. In a particular such embodiment, the camera captures rows of imagery at M rows per second, and the extracted optical data signal has a data rate greater than M symbols per second (e.g., 2M symbols per second, or more). Again, the extracted optical data signal can be used as key data is establishing an authenticated session between two devices on a network.

A further method involves sensing serial optical data in information output by a camera of a portable device. The method further includes discerning one or more particular region(s) in a field of view of the camera, based on a detectability of the serial optical data in such region(s). Such region(s) is then identified on a display of the device, so that the user can re-orient the portable device based on such information.

Yet another method includes sensing serial optical data in information output by a camera of a portable device, and then changing a focus of the camera to improve a signal to noise ratio of the sensed serial optical data. This change of focus is desirably undertaken by a processor configured to perform such act, rather than under the control of a human operated.

The technology also includes a portable device having a camera and plural differently-colored light sources, as well as a processor and a memory. The memory contains software instructions that configure the device to operate different of the light sources while exposing different rows of imagery in a frame. The resulting rows of imagery are then processed to derive color pixel information.

To provide a comprehensive disclosure, while complying with the statutory requirement of conciseness, applicant incorporates-by-reference each of the documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

In view of the wide variety of embodiments to which the principles and features discussed above can be applied, it should be apparent that the detailed embodiments are illustrative only, and should not be taken as limiting the scope of the invention. Rather, I claim as my invention all such modifications as may come within the scope and spirit of the following claims and equivalents thereof.

The invention claimed is:

1. A method employing a smartphone video camera, the method comprising the acts:
    using said video camera to capture N frames per second of imagery, each frame comprising plural rows of pixel data;
    processing said rows of pixel data to yield a time-varying output signal; and
    discerning from said output signal a data signal conveying more than N symbols per second;
    wherein said processing and discerning acts comprise processing averages of signals from successive rows of pixels, with a pseudo-inverse of a matrix representing an aperture function for the camera, to discern a data signal having a data rate greater than N symbols per second.

2. The method of claim 1 that includes using information conveyed by said data signal to establish a secure wireless connection between two devices on a network.

3. The method of claim 1 that includes:
processing rows of pixel data of a first color to yield a first time-varying output signal;
processing rows of pixel data of a second color to yield a second time-varying output signal; and
discerning from said output signals a data signal conveying more than 2N symbols per second.

4. The method of claim 3 that further includes processing rows of pixel data of a third color to yield a third time-varying output signal, and discerning from said output signals a data signal conveying more than 3N symbols per second.

5. The method of claim 1 wherein the camera captures rows of imagery at M rows per second, and the method includes discerning from said output signal a data signal conveying more than M symbols per second.

6. The method of claim 5 that includes:
processing rows of pixel data of a first color to yield a first time-varying output signal;
processing rows of pixel data of a second color to yield a second time-varying output signal;
processing rows of pixel data of a third color to yield a third time-varying output signal; and
discerning from said output signals a data signal conveying more than 3M symbols per second.

7. A method of optical signaling, using a portable device camera comprising rows of pixels operated in a rolling shutter fashion, wherein not all parts of a captured image are recorded at the same time, and wherein the camera captures frames of imagery in a video mode at N frames per second, the method comprising processing averages of signals from successive rows of pixels, with a pseudo-inverse of a matrix representing an aperture function for the camera, to discern a data signal having a data rate greater than N symbols per second.

8. The method of claim 7 wherein the camera captures rows of imagery at M rows per second, and the method comprises processing said row data to extract an optical data signal having a data rate greater than M symbols per second.

9. The method of claim 8 that includes processing said row data to extract an optical data signal having a rate of more than 2M symbols per second.

10. A method of optical signaling, using a portable device camera comprising rows of pixels operated in a rolling shutter fashion, wherein not all parts of a captured image are recorded at the same time, and wherein the camera captures frames of imagery in a video mode at N frames per second, the method comprising processing a sequence of data comprising averages of signals from successive rows of pixels, with a pseudo-inverse of a matrix representing an aperture function for the camera, to extract an optical data signal having a data rate greater than N symbols per second.

* * * * *